United States Patent
Kawada et al.

(10) Patent No.: US 7,546,315 B2
(45) Date of Patent: Jun. 9, 2009

(54) DEVICE FOR REPORTING SOFTWARE PROBLEM INFORMATION

(75) Inventors: Yoshito Kawada, Sagamihara (JP); Masahiko Maedera, Niiza (JP); Kei Sugano, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 11/558,960

(22) Filed: Nov. 13, 2006

(65) Prior Publication Data

US 2007/0150500 A1    Jun. 28, 2007

(30) Foreign Application Priority Data

Dec. 28, 2005   (JP) ............................... 2005-379254

(51) Int. Cl.
*G06F 17/00* (2006.01)
(52) U.S. Cl. .................... 707/104.1; 707/101; 707/102; 707/103 R
(58) Field of Classification Search ............... 707/1–10, 707/100–104.1, 200–206
See application file for complete search history.

(56) References Cited

U.S. PATENT DOCUMENTS 5,797,011 A * 8/1998 Kroll et al. ................... 717/137
6,205,418 B1 * 3/2001 Li et al. .......................... 704/8

FOREIGN PATENT DOCUMENTS

| JP | PUPAH04111121 | 4/1992 |
|---|---|---|
| JP | PUPAH07146784 | 6/1995 |
| JP | PUPAH09016769 | 1/1997 |
| JP | PUPAH09081377 | 3/1997 |
| JP | PUPAH09305429 | 11/1997 |
| JP | PUPAH10154145 | 6/1998 |
| JP | PUPAH10294818 | 11/1998 |
| JP | 2001297083 | 10/2001 |
| JP | 2001337950 | 12/2001 |
| JP | 2002073959 | 3/2002 |
| JP | 2002108855 | 4/2002 |
| JP | PUPA2002215617 | 8/2002 |
| JP | 2003122751 | 4/2003 |
| JP | PUPA2003122751 | 4/2003 |
| JP | PUPA2003345923 | 12/2003 |
| JP | PUPA2004199622 | 7/2004 |
| JP | 2004280275 | 10/2004 |
| JP | PUPA2005135377 | 5/2005 |
| JP | PUPA2005215285 | 8/2005 |
| JP | PUPA2005242825 | 9/2005 |

* cited by examiner

*Primary Examiner*—Isaac M Woo
(74) *Attorney, Agent, or Firm*—Toler Law Group

(57) ABSTRACT

A device, method, and program for automatically reporting a software problem for a reproducing procedure and determining a place where a problem occurred in global user environments. Data including various types of messages assigned to individual languages is extracted from resource files of software that is used in international environments, and the data, together with additional attributes, is stored as a database in a form in which correspondences between languages are defined. Processing including translation of texts and translation of image data is performed for a problem reproductive scenario, a problem report, a screen shot, and other functions using the resource database prepared in the first step. The individual processing functions are organically linked to existing problem management tools. Thus, it enables switching of the language of data at appropriate time when data is exchanged in the software support operation.

5 Claims, 32 Drawing Sheets

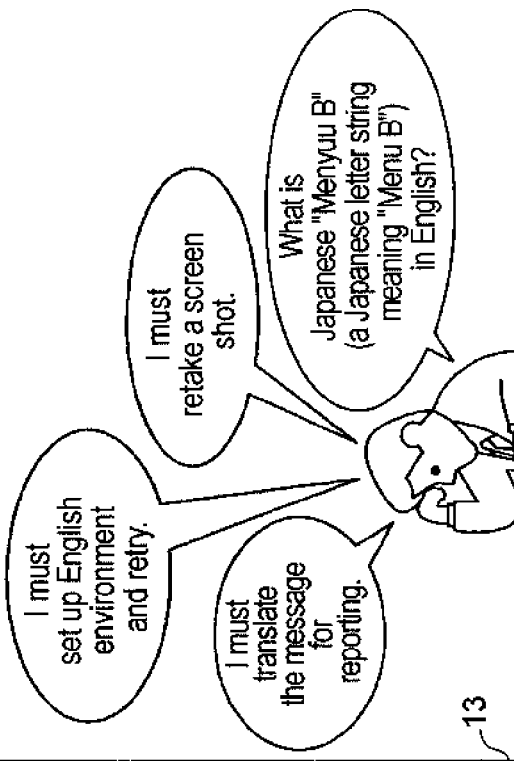
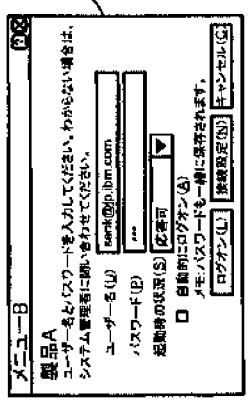
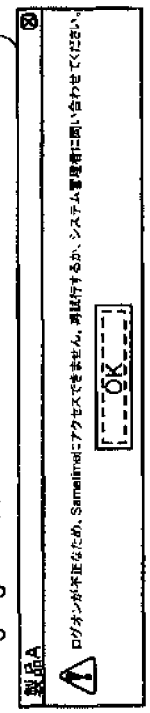
FIG. 1

Resource crawler and resource database

FIG. 21

In the [氏名] field type ($ABCDEF)
Click [了解する]
Assert message [受け付けました]

- 氏名　　　　　　　　In the [] field type ($ABCDEF)
- 了解する　　　　　　Click []
- 受け付けました　　　Assert message []

| Japanese | English | Korean | Message window type |
|---|---|---|---|
| 警告 | Warning | 경고 | vb Exclamation |
| 警告形式のウィンドウ | Warning Window | 경고메시지 | vbExclamation |
| 重大エラー形式のウィンドウ | Fatal Error Window | 치명적인에러 | vbCritical |

(b) 221

| Japanese | English | Korean | Message window type |
|---|---|---|---|
| 警告 | Warning | 경고 | vb Exclamation |
| エラーが起きました。 | Error happened. | 에러가 발생했습니다 | vbExclamation |
| エラーが起きました。 | Error occurred. | 에러가 발생했습니다 | vbCritical |

In the [] field type ($ABCDEF)   Your Name
Click []                          OK
Assert message []                 Your request is accepted In the [Your Name] field type ($ABCDEF)
Click [OK]
Assert message [Your request is accepted]

FIG. 27

```
Option Explicit

' 様々な形のメッセージウィンドウを出すプログラム

' メッセージウィンドウ 1
MsgBox " エラーが起きました。", vbCritical, " 重大エラー形式のウィンドウ "          } 271

' メッセージウィンドウ 2
MsgBox " エラーが起きました。", vbExclamation, " 警告形式のウィンドウ "              } 272

' メッセージウィンドウ 3
MsgBox " エラーが起きました。", vbYesNo, " YES/NO 形式のウィンドウ "                 } 273

' メッセージウィンドウ 4
MsgBox " エラーが起きました。", vbAbortRetryIgnore + vbDefaultButton3, 中止・再試行・無視形式のウィンドウ "  } 274
```

FIG. 28
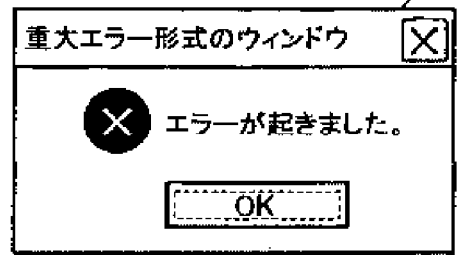
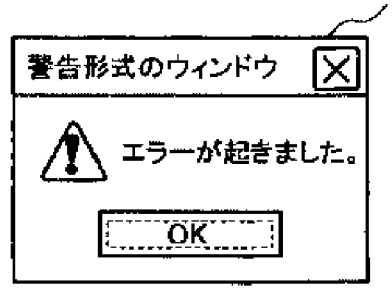
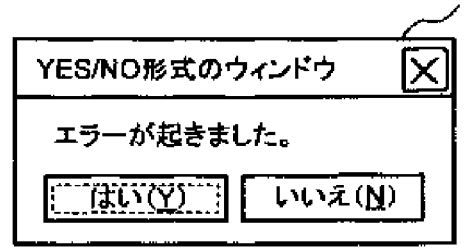
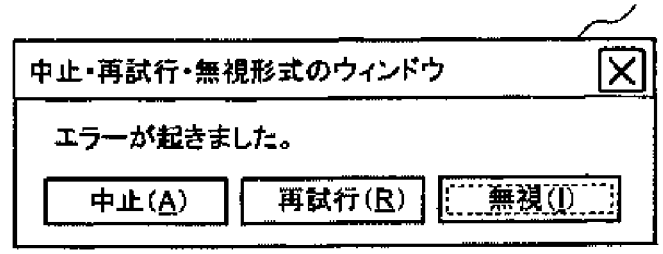

| Japanese | English | Korean | Message window type | Dialog title |
|---|---|---|---|---|
| エラーが起きました。 | Error occurred. | 에러가 발생했습니다 | vbCritical | 重大エラー形式の ウィンドウ |
| エラーが起きました。 | Error happened. | 에러가 발생했습니다 | vbExclamation | 警告形式のウィンドウ |
| エラーが起きました。 | Error occurred. | 에러가 발생했습니다 | vbCritical | 警告形式のウィンドウ |

```
LANGUAGE LANG_JAPANESE, SUBLANG_DEFAULT                    ——— 311
#define IDD_TEST          100
#define IDC_STATIC_1      101
#define IDC_STATIC_2      102
#define IDI_TEST          103
#define IDC_NUMBER        104                               } 312
#define IDC_INPUTPATH     105
#define IDC_INBUTTON      106
#define IDC_MSG           107

IDD_TEST DIALOGEX 22, 17, 257, 130                          ——— 313
CAPTION "win32 アプリケーションテスト                         ——— 314
BEGIN                                                       ——— 315
    LTEXT         " データ (&D):",IDC_STATIC_1,6,9,50,8
    EDITTEXT      IDC_NUMBER,56,6,104,12
    LTEXT         " フォルダ (&F):",IDC_STATIC_2 ,6,25,52,8
    EDITTEXT      IDC_INPUTPATH,56,22,172,12
    PUSHBUTTON    "...",IDC_INBUTTON,232,22,14,12
    PUSHBUTTON    " 実行 (&R)",IDOK,57,107,54,13
    PUSHBUTTON    " 終了 (&X)",IDCANCEL,145,107,54,13
    LTEXT         "",IDC_MSG,0,85,255,12
END
```

FIG. 32

| Japanese | English | Korean | ID | Parent ID |
|---|---|---|---|---|
| Win32 アプリケーションテスト | Win32 Application Test | 윈도우즈 32 애플리케이션 테스트 | 100 | None |
| データ | Data. | 데이터 | 101 | 100 |
| フォルダ | Folder | 폴더 | 102 | 100 |

330 (ID column), 331 (Parent ID column)

FIG. 33

C:\Program Files\IBM\Application\lib\library.jar

MANIFEST.MF

Bundle-Version : 2.3.1 com.ibm.app.window.MessageResource_ja.properties window.buttons.abort = 中止 window.buttons.retry = 再試行 window.buttons.ignore = 無視 com.ibm.app.window.MessageResource_en.properties window.buttons.abort = Abort window.buttons.retry = Retry window.buttons.ignore = Ignore C:\Program Files\IBM\Application\ext\com.example.menu_1.0 feature_ja.properties menu.subset.break = 中止 feature_ja.properties menu.subset.break = Break

FIG. 34

| id | messagekey | English | Japanese | class name | Version | folder |
|---|---|---|---|---|---|---|
| | | 350 | | 351 | 352 | 353 |
| 0 | window.butt ons.abort | Abort | 中止 | com.ibm.app.win dow | 2.3.1 | C:¥IBM¥Application ¥lib¥library.jar |
| 1 | window.butt ons.retry | Retry | 再試行 | com.ibm.app.win dow | 2.3.1 | C:¥IBM¥Application ¥lib¥library.jar |
| 2 | window.butt ons.ignore | Ignore | 無視 | com.ibm.app.win dow | 2.3.1 | C:¥IBM¥Application ¥lib¥library.jar |
| . . . | | | | | | |
| | menu.subset .break | Break | 中止 | com.example.me nu | 1.0 | C:¥Program Files¥IBM¥Applicat ion¥ext¥($class_na me)_($version)¥feat ure_($lang).propertie s |
| . . . | | | | | | | ns
DEVICE FOR REPORTING SOFTWARE PROBLEM INFORMATION

BACKGROUND OF THE INVENTION

1. Technical Field

The present invention relates to problem information reporting systems, and in detail, relates to a device, a method, and for reporting software problems in multilingual environments for users, support, and development and maintenance.

2. Background

Along with recent globalization, in computer systems, especially software, development work, maintenance work, and services in, for example, a support contact for users have been performed cooperatively by separate multinational teams. Moreover, it is not rare for users to use international software globally in local offices in individual countries. However, even now, in these multinational or multilingual environments in which software is used, supported, developed and maintained, when a problem has occurred in software, a customer support section needs to translate a problem report and the like and submit the report to relevant sections for quickly fixing the problem. For example, a user in a certain country has encountered a problem, a customer support section needs to translate the content of the problem, a procedure for reproducing the problem, and the like into a language that can be understood by engineers and the like in a foreign country to report to a maintenance section and a development section in the country.

Many systems and methods are known for supporting translation of characters (texts) (for example, a multilingual manual preparing device disclosed in Japanese Unexamined Patent Application Publication No. 2004-280275, a method for displaying pairs of original and translated texts disclosed in Japanese Unexamined Patent Application Publication No. 2001-337950, and a multilingual document generating system disclosed in Japanese Unexamined Patent Application Publication No. 2001-297083). Moreover, for example, devices are disclosed, which recognize and translate not only characters but also character parts in data in which images and characters are mixed (for example, see Japanese Unexamined Patent Application Publication No. 2003-122751, Japanese Unexamined Patent Application Publication No. 2002-108855, and Japanese Unexamined Patent Application Publication No. 2002-73959).

BRIEF SUMMARY OF THE INVENTION

However, the object of all techniques disclosed in the foregoing Patent Documents 1 to 5 is to improve efficiency in general translation of natural languages, and these techniques cannot provide solutions by themselves to improve efficiency in reporting a software problem in complicated multilingual environments. A trouble reception system disclosed in Patent Document 6 is also known. However, in this system, a user needs to submit an access request together with a user-desired language to a trouble reception center. Thus, even though reception in a user-desired language is enabled, this system cannot be applied to subsequent communication or trouble analysis among support, maintenance and development sections in multiple countries.

In general, a local customer service section, call center or the like receives a problem report or a complaint from a user of a software product and relays the problem report or the complaint to a development section in, for example, the U.S., or, nowadays, India or China. Since responsible persons that have different nationalities are inevitably involved in communication among these sections, a bottleneck of a language barrier always exists. For example, when a product of a U.S. software vendor, development of which is outsourced to India, is sold in Japan, relay in Japanese, English, and Hindi is performed.

The quickness of response to a complaint, i.e., the turn around time (TAT) required to fix a problem, is directly related to customer satisfaction. Thus, accurate and quick communication among the sections is mandatory. However, in many cases, human resources having a good knowledge of the functions of a product and excellent linguistic capability are limited, or no reserve human resources for contingencies are available. Thus, the efficiency of the process among the sections needs to be improved. Specifically, a problem of a software product is handled according to, for example, the following procedure. A customer in Japan reports a problem to, for example, a sales agent or a customer center in Japan. A responsible person in Japan reproduces the problem on a Japanese operation system and inputs the procedure for reproducing the problem into a problem management system in English (the problem is also reproduced on an English operating system for English translation). A development leader (a team leader) in the U.S. evaluates the nature of the problem. When the problem is due to a bug in a program, the development leader assigns a job of fixing the problem to an Indian developer.

Recently, the efficiency of handling of troubles with customers has been improved by, for example, installing CRM (Customer Relationship Management) software or using a tool called CLEARQUEST (registered trademark) that is an IBM (registered trademark) product and traces and manages problems. These products include many functions of improving the efficiency, for example, a function of quantitative analysis of customer satisfaction, a knowledge database function, a problem classification function, and a function of automatically generating a response mail. However, these products include no function of improving the efficiency of relay in different languages. In many cases, the relay in different languages is the most significant bottleneck in the actual operation.

FIG. 1 shows an example of a current software problem report. In a problem report 10, in addition to steps up to a point where a problem occurred, a screen copy 11 (a screen shot) of a menu B selected after starting up a product A, a screen 12 on which an error message was displayed, and an opinion 13 of a user or a support section are described. In general, such a problem report is first created in a language (in this case, Japanese) in an environment that is used by the user, and the support section needs to analyze and translate this problem report to an appropriate language and submit the translated problem report to an appropriate section. For example, in order to submit a report in English, an English environment that is equivalent to the environment, which is used by the user, needs to be set up to determine whether the problem can be actually reproduced. Even when the problem is reproduced in a Japanese environment, the problem is not always reproduced in an English environment. Thus, the utmost caution is required, for example, when an operating environment is set up. Even when the problem has been successfully reproduced, a screen shot needs to be retaken, and a menu title (in this case, menu B) needs to be correctly translated into English using appropriate technical terms that are used in the software. This requires a lot of workload of a section that supports many software products and reports problems.

The present invention was made to solve the various problems described above, and it is an object of the present invention to provide a system and the like for automatically reporting a software problem for a reproducing procedure and a determination of a part causing a problem in global user environments.

BRIEF DESCRIPTION OF THE DRAWING

FIG. 1 is an illustration showing an exemplary software problem report related to problems addressed by the present invention.

FIG. 21 shows the process of cutting out an original text that requires a translated text in the case of a text format.

FIG. 22 shows the process of obtaining the correspondence between an original text and a translated text.

FIG. 27 is an illustration showing exemplary source code of a program that is scanned by the resource crawler.

FIG. 28 is an illustration showing exemplary message windows at the time of executing the program shown in FIG. 27.

FIG. 31 is an illustration showing a part of source code in which the shape of a dialog window and the IDs of components that constitute the dialog window are defined.

FIG. 32 is an illustration showing a resource database that retains window IDs.

FIG. 33 is an illustration showing exemplary property resource files that are retained in Java (registered trademark).

FIG. 34 is an illustration showing a resource database in which message keys and additional attributes are stored.

DETAILED DESCRIPTION OF THE INVENTION

Figure 2:
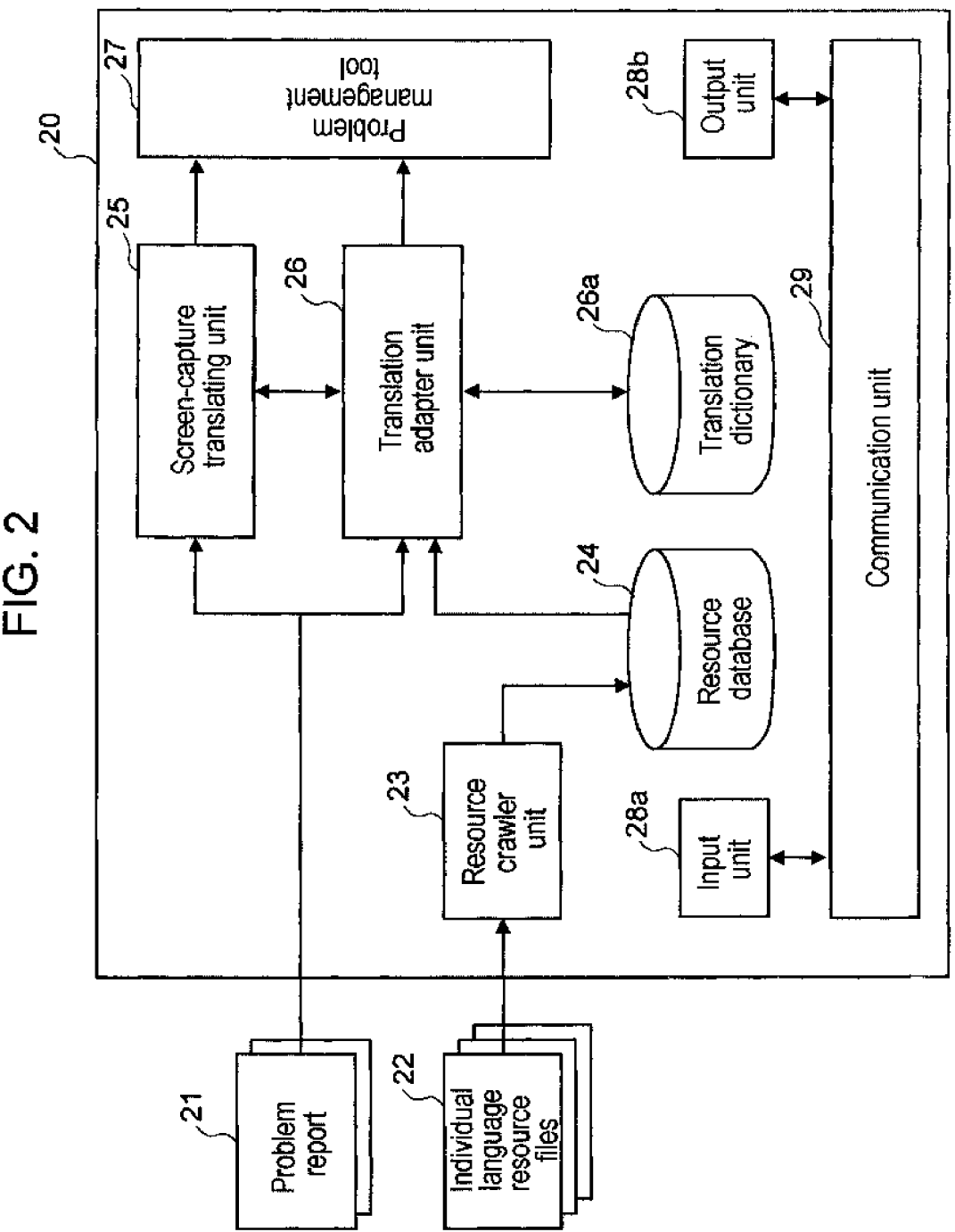
FIG. 2 is a functional block diagram showing a software-problem reporting device as an embodiment of the present invention.

While the present invention can be implemented as various embodiments, solution means as to main embodiments will now be described.

In a first embodiment, (A) a device for reporting a software problem in multiple languages is provided. The device comprises:

(B) a resource searching unit that searches software covered by problem support and a plurality of resource files that are used to execute the software and correspond to a plurality of languages, extracts and collects message keys and character strings corresponding to the message keys from each of the resource files, and extracts additional attributes of the character strings, the additional attributes providing a basis for translating the character strings;

(C) a resource database for storing the character strings and the additional attributes, which are extracted by the resource searching unit; and (D) a translation adapting unit that extracts character strings that need to be translated from a problem report, in which a problem of the software covered by problem support is described, and translates and embeds the character strings in the problem report with reference to the resource database.

The foregoing device may further comprise:

a screen translating unit that separates character strings and an image part other than the character strings in an image and embeds translated character strings corresponding to the character strings in the separated image part when the problem report includes the image.

In a second embodiment, (A) a method for reporting a software problem in multiple languages is provided. The method comprises:

(B) a step of searching software covered by problem support and a plurality of resource files that are used to execute the software and correspond to a plurality of languages, extracting and collecting message keys and character strings corresponding to the message keys from the resource files, and extracting additional attributes of the character strings, the additional attributes providing a basis for translating the character strings;

(C) a step of storing the character strings and the additional attributes, which are extracted in the extracting step, in a resource database; and (D) a step of extracting character strings that need to be translated from a problem report, in which a problem of the software covered by problem support is described, and translating and embedding the character strings in the problem report with reference to the resource database.

The forgoing method may further comprise:

a step of separating character strings and an image part other than the character strings in an image and embedding translated character strings corresponding to the character strings in the separated image part when the problem report includes the image.

The forgoing method may be provided as a computer program that causes a computer to perform the foregoing functions. This computer program may be provided via a communication medium or a computer-readable recording medium that stores the program.

In yet another embodiment, (A) a method for maintaining a computer system that includes software used in multilingual environments is provided. The method comprises:

(B) at the time of translating a software problem report in a language into other languages;

(C) a step of extracting and collecting message keys and character strings corresponding to the message keys from data about software covered by problem support and extracting additional attributes of the character strings, the additional attributes providing a basis for translating the character strings;

(D) a step of storing the character strings and the additional attributes, which are extracted in the extracting step, in a database; and (E) a step of extracting character strings that are included in a problem report of the software covered by problem support and need to be translated, and translating and embedding the character strings in the problem report with reference to the database.

The advantages that can be obtained from the foregoing solution means of the present invention are summarized as follows:

(1) Data including various types of message assigned to individual languages is extracted from resource files of software that is used in international environments, and the data, together with additional attributes, is stored as a resource database in a form in which correspondences between languages are defined. In general, a resource file means a file that stores unexecutable data (resource), such as character strings, icons, and images, that is logically located with software and required for the operation. When the data including messages is extracted, message keys are used. Message keys are keys for identifying various types of message that are displayed by software and generally included in resource files. In some cases, a resource file name is a message key.

(2) Processing including translation of texts and translation of image data is performed for a problem reproductive scenario, a problem report, a screen shot, and other functions using the resource database prepared in the foregoing step (1). The individual processing functions are organically linked to existing problem management tools. Thus, a device, a method, and a program are provided, which enable switching of the language of data at appropriate time when data is exchanged in the software support operation.

A method for separating software and translation information like resource bundle in Java (registered trademark) is prevailing for multilingual software support. This information is used only for translation in the software. In the present invention, the stored individual language translations are extracted and again stored in a form in which correspondences between languages are defined. Thus, a list of messages that appear in software and correct expressions of the messages in multiple languages can be used from other software. In this method, the source code (source code file) of corresponding software need not be accessed.

A problem reproductive scenario, a report, screen capture, and the like are created and used in a language that is used by a responsible person. When data is transferred to another country, the data needs to be translated, and specific types of data need to be re-created in a new language environment. In the present invention, language-unique data existing in a reproductive scenario, screen capture, and the like is dynamically replaced with data extracted from resources. Thus, the work of re-operation can be reduced, and data can be correctly transferred by performing switching in which correct translation is performed on data from a single source.

In the present invention, relay of a problem report operation in different languages can be performed naturally using data provided in international software. A known method, software, or service method for maintaining computer systems does not include this function. Even when a software problem is reported in multiple languages, machines on which multiple languages are switched for reproducing the problem need not be prepared, and a system or the like can be constructed, in which language-dependent parts included in a problem report and the like need not be re-created for different languages. In the present invention, a language barrier in data communication or problem reproduction related to products can be reduced utilizing individual language resources used by software for supporting international environments.

Best Mode for Carrying Out the Invention

The present invention will now be described along with exemplary embodiments with reference to the drawings. In the following description, the resource searching unit, the screen translating unit, and the translation adapting unit, which are described above, are called a resource crawler unit, a screen-capture translating unit, and a translation adapter unit, respectively.

FIG. 2 is a functional block diagram showing a software-problem reporting device 20 as an embodiment of the present invention. The software-problem reporting device 20 according to the present embodiment handles a problem report 21 and individual language resource files 22 (hereinafter called resource files 22 simply) as input data and mainly includes a resource crawler unit 23, a resource database 24, a screen-capture translating unit 25, and a translation adapter unit 26. The software-problem reporting device 20 may further include a known problem management tool 27, which has been commercially introduced. The software-problem reporting device 20 may further include a conventional input unit 28a such as a keyboard or a mouse, an output unit 28b such as a CRT or a liquid crystal screen, and a communication unit 29 that includes an Ethernet (registered trademark) adapter and the like. Furthermore, the software-problem reporting device 20 may exchange data for input and output with other systems through communication lines.

The foregoing configuration is just an example and not restrictive. Other configurations that have the same functions may be adopted. The functions of the individual units of the device will now be described.

The resource crawler unit 23 has functions of extracting character strings, which can be translated and retained in a software program to be supported at the time of occurrence of a problem, from files constituting the program or a source file of the program. Specifically, the resource crawler unit 23 has functions of:

(1) searching the individual language resource files 22 in a software program and the execution environment;

(2) extracting message keys of individual languages and character strings corresponding to the message keys from the individual language resource files 22 and storing the message keys and the character strings in the resource database 24;

(3) scanning a source file of the software program when the source file is available and storing additional attributes in the resource database 24, the additional attributes (additional data) being attributes (data) that provide a basis for correctly determining a translated text at the time of translation; and (4) obtaining a window ID and files (for example, class files that are read by the software) used at the time of executing the software program and storing additional attributes in the resource database 24.

The resource database 24 is a database for retaining the translation character strings, which have been collected by the resource crawler unit 23. Specifically, the resource database 24 retains the following data:

(1) Translation character strings, which have been collected by the resource crawler unit 23, and additional attributes;

(2) Data of standard buttons, icons, and the like in a system;

(3) Naming conventions for general resource files; and (4) Change histories of the resource files 22.

The translation adapter unit 26 has functions of translating a problem report, which are used when dynamic translation is performed. More than one translation adapter unit 26 may exist for individual report formats (a text format, an image format, and a reproductive scenario script format). Specifically, the translation adapter unit 26 has functions of:

(1) extracting character strings (an original text) that need to be translated from texts;

(2) obtaining a translated text on the basis of the original text;

(3) removing ambiguity from the translated text, removing ambiguity meaning selecting the most reliable candidate for the translated text, which does not cause an erroneous determination, when the translated text cannot be uniquely determined; and (4) embedding the translated text in the original texts.

When an image is included in a problem report, the screen-capture translating unit 25 is invoked by the translation adapter unit 26 or the problem management tool 27 to cut out character strings from the image included in the report or embed character strings in the image. Specifically, the screen-capture translating unit 25 has functions of:

(1) separating text parts and other parts in an image (bitmap);

(2) transforming the extracted text parts into byte strings (an OCR function);

(3) embedding character strings in the image; and (4) determining icons and the like included in the image.

Furthermore, the screen-capture translating unit 25 optionally performs translation with reference to the provided translation dictionary 26a. A known method may be used for the translation dictionary 26a.

The problem management tool 27 is a tool that totally supports, for example, problem report management, tracking of the states of problems being solved, and transmission of information to responsible sections. While the case where the problem management tool 27 is included in the software-problem reporting device 20 is shown in FIG. 2 for the sake of simplification, the problem management tool 27 may be provided in, for example, a central server through communication lines via the communication unit 29.

Figure 3:
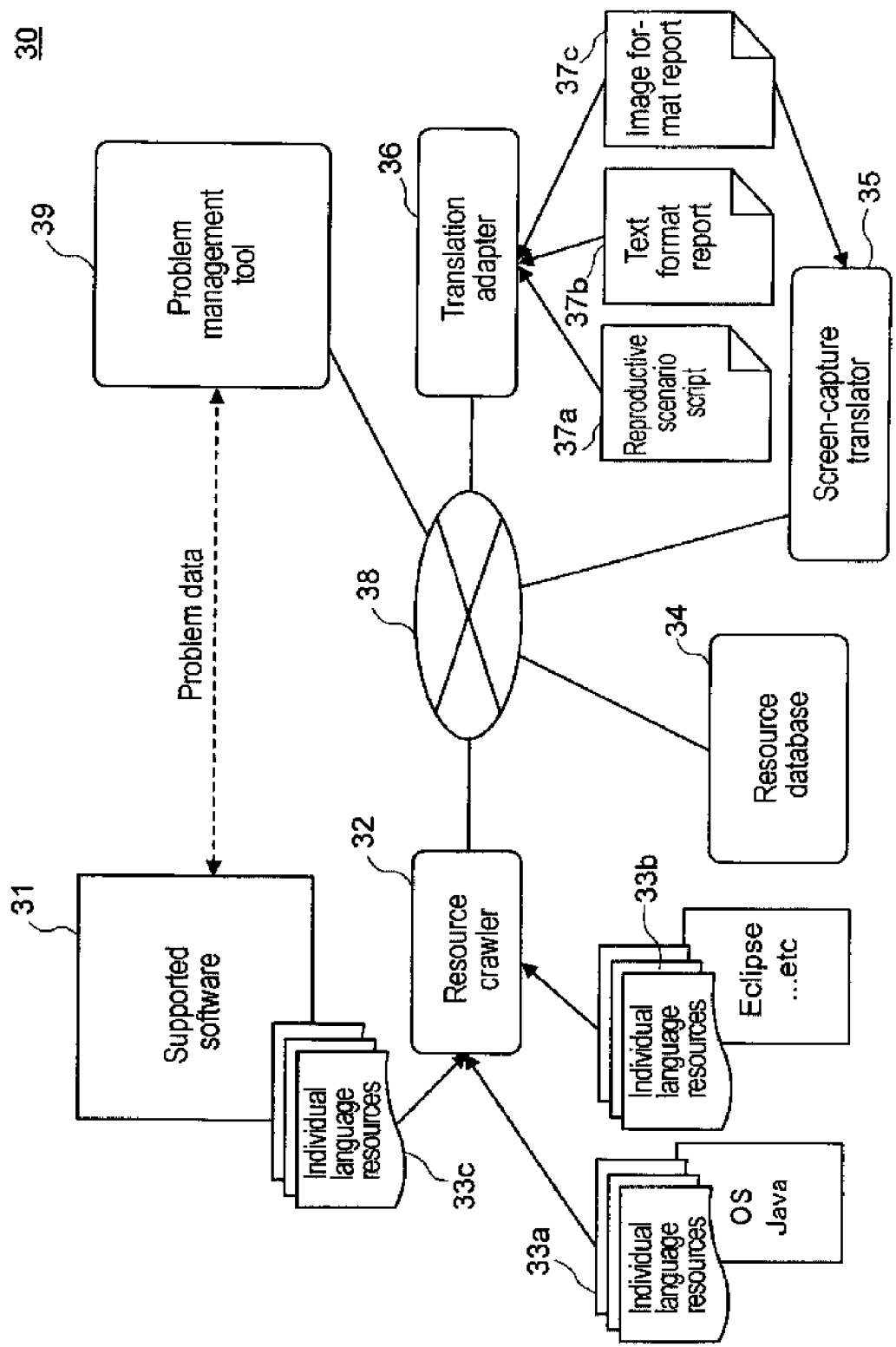
FIG. 3 is an illustration showing the overall structure of a software-problem reporting system that is another embodiment of the present invention.

FIG. 3 is an illustration showing the overall structure of a software-problem reporting system 30 that is a second embodiment of the present invention. In the present embodiment, the resource crawler unit 23, the screen-capture translating unit 25, and the translation adapter unit 26, which are the main units of the foregoing software-problem reporting device 20, are implemented as a computer system that includes separate devices (typically, client devices and server devices that are connected to each other through a network 38). Although not shown, the individual devices may be implemented as computers that are connected to the network 38. Although the individual devices are separately connected to the network 38 in this drawing, typically, a resource database 34, a translation adapter 36, and a problem management tool 39 may be provided in a center server in a maintenance section. More than one such server may be provided or may be individually provided in separate locations such as individual countries, projects, or sections. Furthermore, a resource crawler 32, a supported software 31, and individual language resources 33a, 33b, and 33c (resource files) for individual types of software may be provided in a client device or a server device in a development section or a test section for the sake of analysis. The functions of the individual devices are equal to those of the individual functional units described in the software-problem reporting device 20, and thus the description is omitted here.

Figure 4:
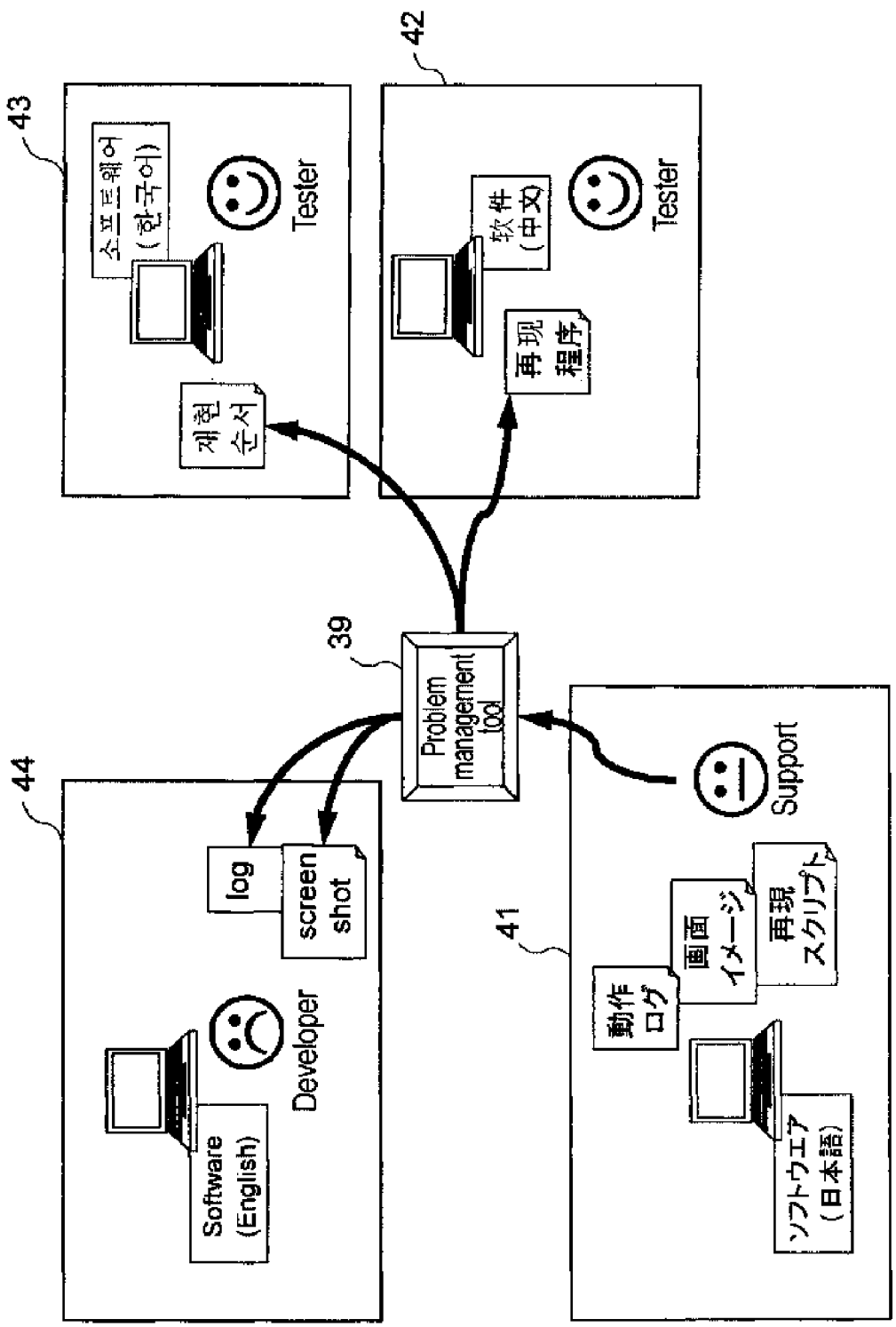
FIG. 4 shows a situation in which individual responsible sections obtain various information reports translated through a problem management tool.

FIG. 4 shows a situation in which data included in a problem management report, such as an operation log, a screen image, and a reproductive script that are supported by the problem management tool 39, is retrieved in languages that are required by responsible sections in individual countries (typically from the resource database). Here, a case is shown, where a support section that handles problems which users encounter and the like is located at the place of a system 41 in Japan, a development section is located at the place of a system 44 in an English-speaking area, and test sections are located at the places of a system 43 in Korea and a system 42 in China. However, the problem management tool 39 does not have a function of translating a problem report. Furthermore, a known product such as CLEARQUEST (registered trademark) may be used as the problem management tool, as described above.

In the present specification, the main units including the resource crawler 32, the resource database 34, a screen-capture translator 35, the translation adapter 36, the problem management tool 39, and the like may be functional units in a device or functions in separate server devices, or represent individual steps in a method. Thus, hereinafter, the main units will be shown without reference numerals, for example, just shown as the resource crawler, as long as such distinction is not required. The processes of the individual units will now be described in detail.

Figure 5:
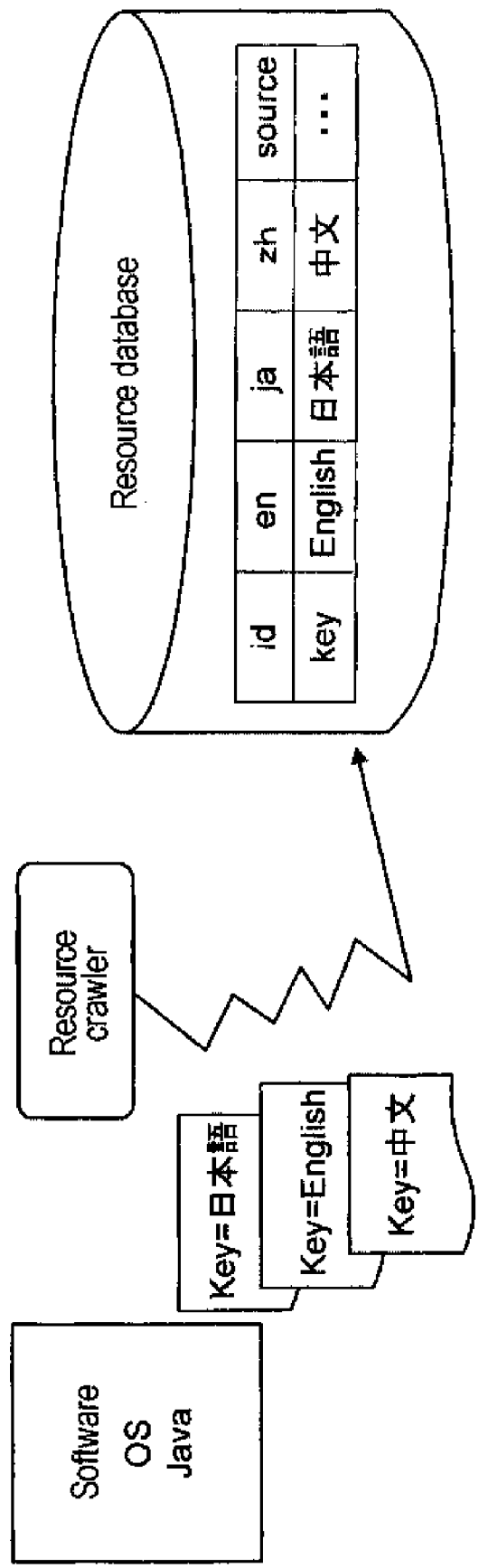
FIG. 5 is a schematic diagram of a resource crawler and a resource database.

FIG. 5 is a schematic diagram of the resource crawler and the resource database. The resource crawler searches the individual language resource files in execution environments of, for example, supported software, an operating system (OS), and Java (registered trademark). Message keys for individual languages and character strings corresponding to the message keys are retained in the individual language resources. The resource crawler creates a table in which correspondences between individual languages are defined on the basis of message keys in the resource database.

Figure 6:
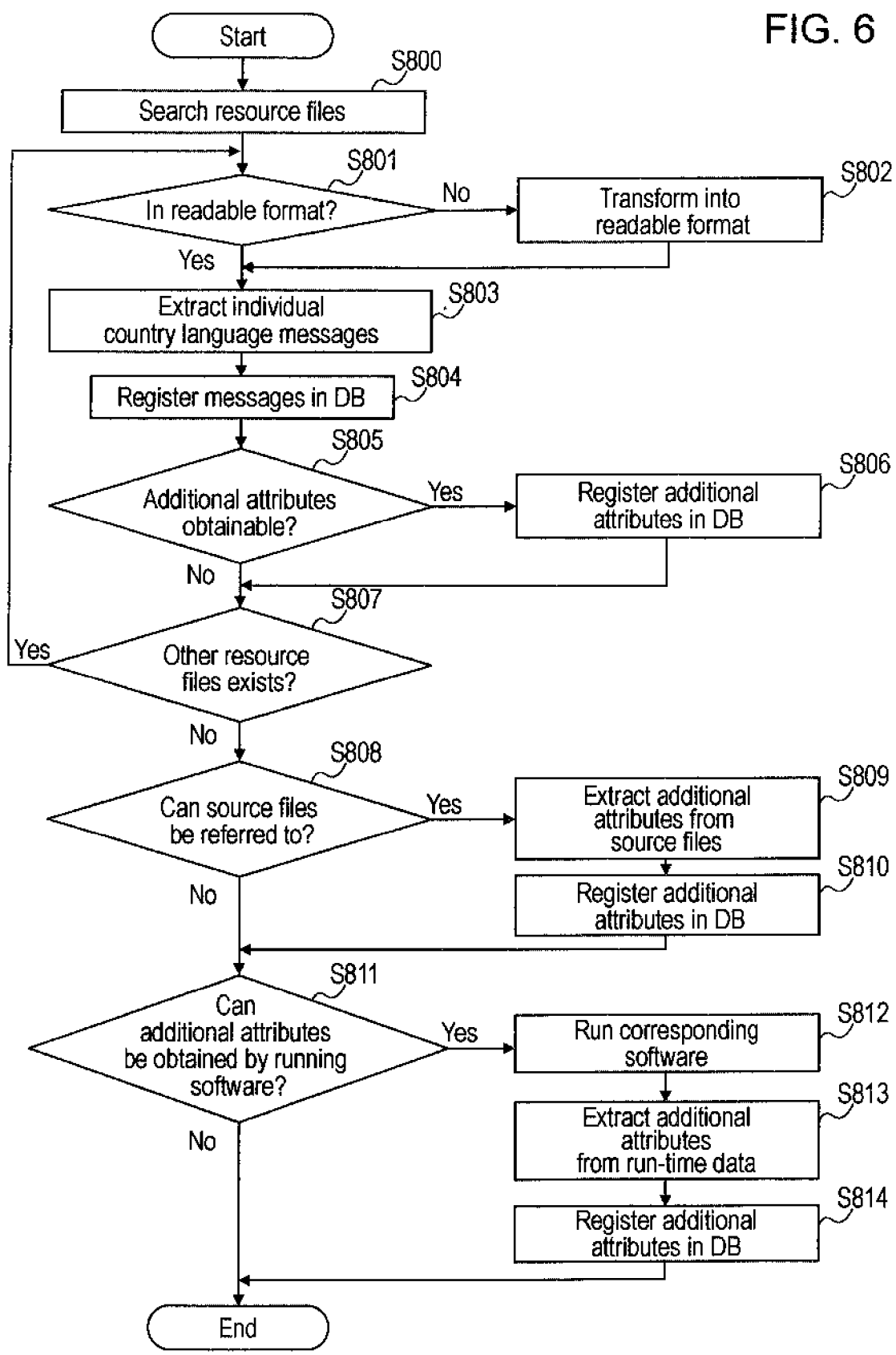
FIG. 6 is an illustration showing the process flow of the resource crawler.

FIG. 6 is an illustration showing the process flow of the resource crawler. In step S800, the resource files are first searched. Then, in step S801, it is determined whether the resource files are in a readable format (that is to say, for example, the resource files are not compressed or not in a binary format). When it is determined that the resource files are not in a readable format, the resource files are transformed into a readable format by performing necessary processing such as decompression (step S802). When it is determined that the resource files are in a readable format, individual country language messages are extracted from the resource files in step S803. Then, in step S804, the messages are registered in the DB (the resource database). Then, in step S805, it is determined whether additional attributes can be obtained. When it is determined that additional attributes can be obtained, the additional attributes are registered in the DB, and the process proceeds to step S807 (step S806). When it is determined that additional attributes cannot be obtained, it is determined whether other resource files exist (step S807), and the process from steps S801 to S806 is repeated for the other resource files. Then, in step S808, it is determined whether source files can be referred to. When it is determined that source files can be referred to, additional attributes are extracted from the source files and registered in the DB, and the process proceeds to step S811 (steps S809 and S810). After the processing of the source files is completed, in step S811, it is determined whether additional attributes can be obtained by running the software. When it is determined that additional attributes can be obtained, finally, the corresponding software is run, the additional attributes are extracted from run-time data and registered in the DB, and the whole process is completed (steps S812 to S814).

Figure 7:
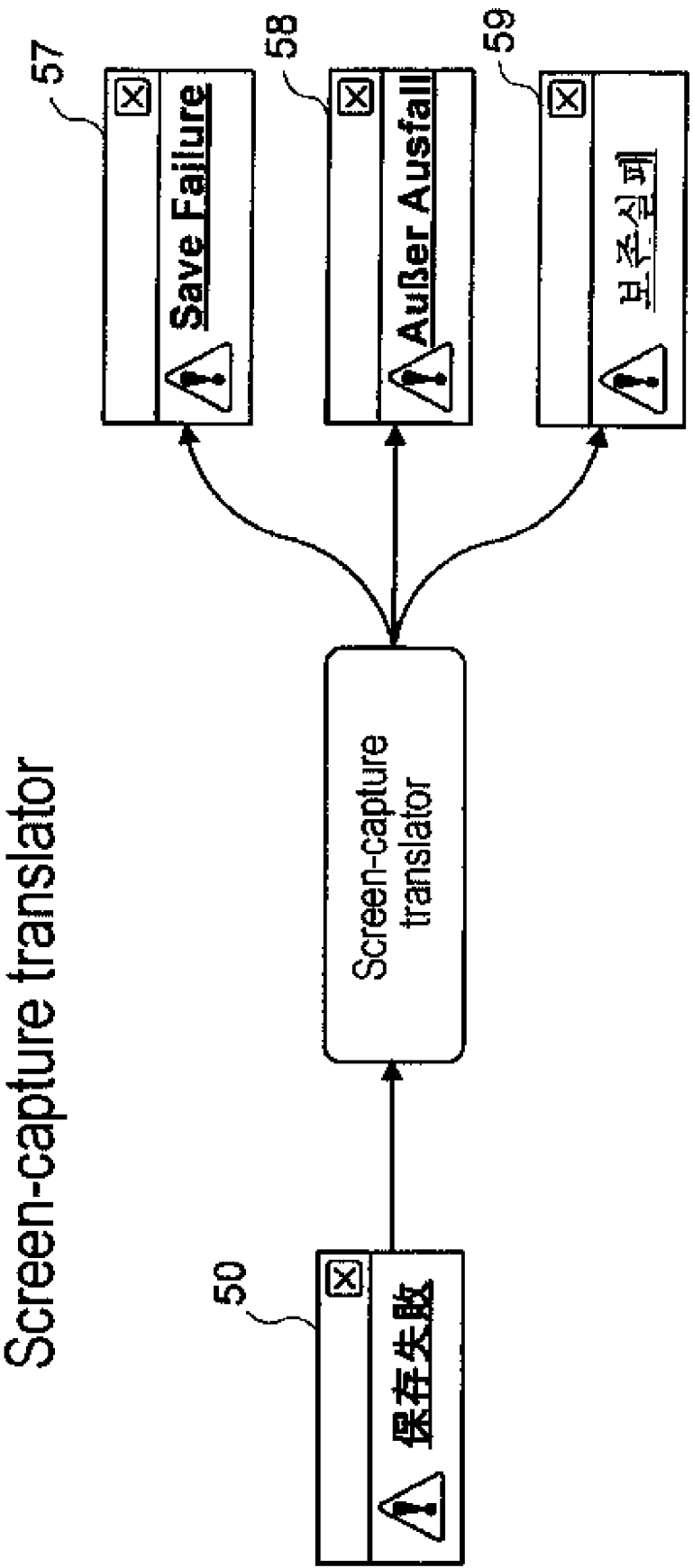
FIG. 7 is a schematic diagram of the process of a screen-capture translator.

FIG. 7 is an illustration showing the process flow of the screen-capture translator. The screen-capture translator has functions of analyzing a message screen (a panel 50) that appears when a problem has occurred, translating to individual country languages only character strings that need to be translated, and embedding the translated character strings in the original screen image, as shown in this drawing. In this drawing, a case is shown, where screens 57, 58, and 59 that are respectively translated into English, German, and Korean are output.

Figure 8:
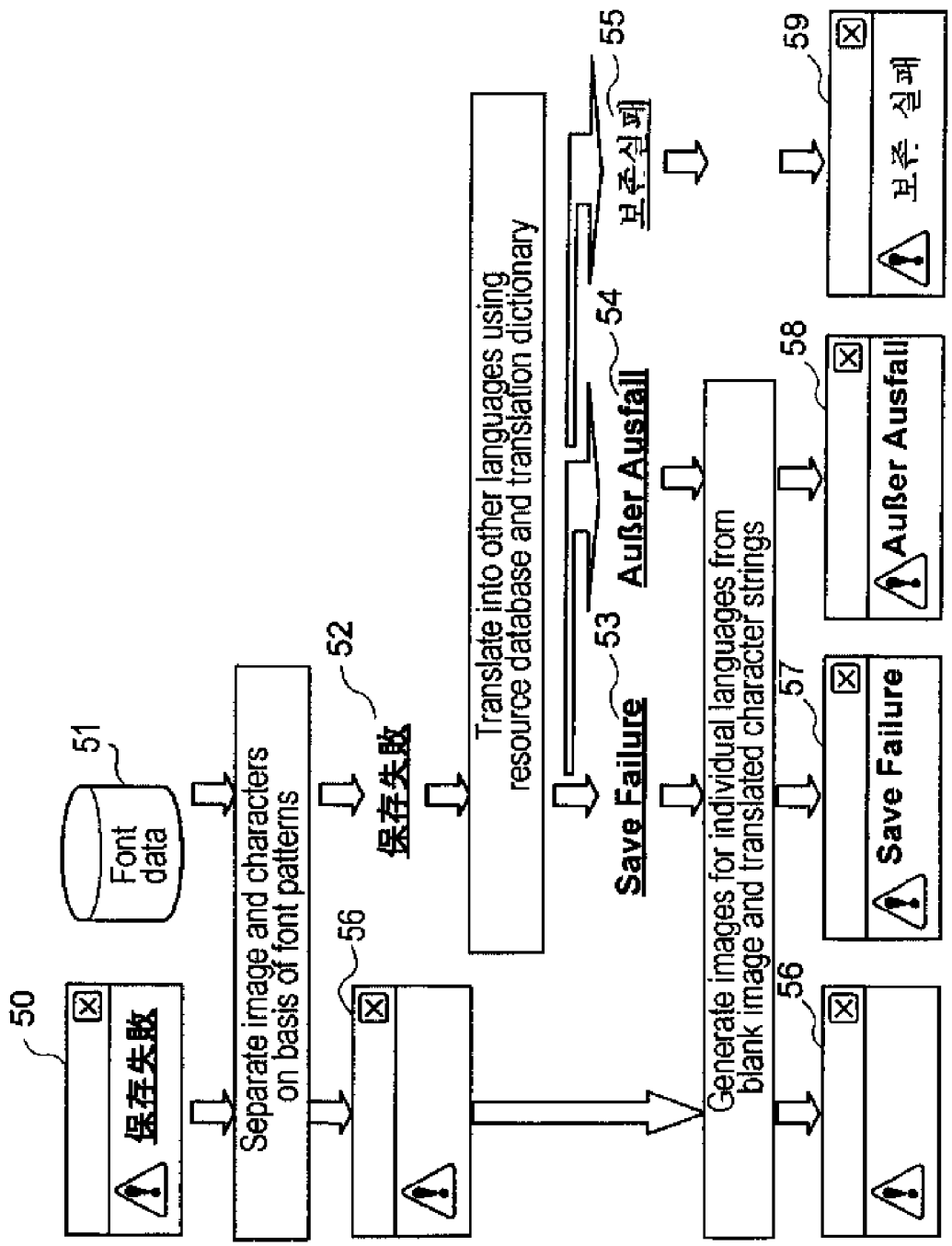
FIG. 8 is an illustration showing the process flow of the screen-capture translator.

FIG. 8 shows the details of the process shown in FIG. 7. That is to say, in the panel 50 subjected to the process, an image and characters are separated on the basis of font patterns that can be obtained from font data 51. Characters that appear on a panel are almost fixed. Thus, font patterns can be efficiently compared by registering in advance characters that are frequently used. A known character recognition technique such as an optical code reader (OCR) may be used. A blank image 56 and a character part 52 are obtained as the result of separating characters and an image from the panel 50. The character part 52 is translated into other languages 53 to 55 with reference to the resource database (when not available in the resource database, a known translation dictionary is used).

In this process, the accuracy of translation can be significantly improved by extracting character strings directly from codes or binary data (in many cases, executable files, compressed files, and the like are provided in a binary format) of the software. This is because such translation is performed by comparing sentences (using the resource database) and thus has no ambiguity in which words or morphological analysis are depended on, and a panel to be translated can be accurately determined by extracting a plurality of character strings from one panel. Moreover, data of icons that are used in panels are data useful for determining the types of messages and panels.

Finally, images for individual languages are generated from a blank image 56 after translation and the translated character strings 53 to 55. As the result of the above process, image data indicated by reference numerals 57 to 59 can be obtained. At this time, in a case where the translated character strings do not fit in the images, the following additional adjustments may be automatically performed:

(1) Fold back the character strings.
(2) Reduce the font size of the character strings.
(3) Enlarge the images.

In some languages (for example, Arabic), a character string is written from right to left. In such cases, character strings can be embedded in an image after the image is reversed horizontally.

Figure 9:
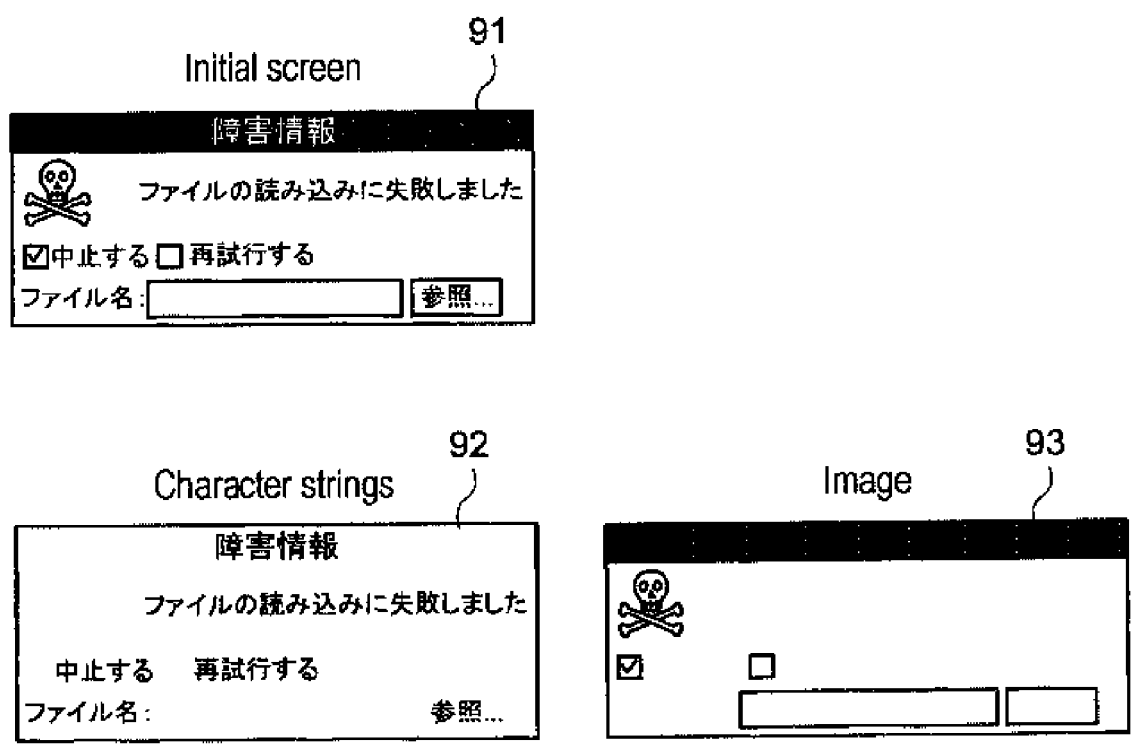
FIG. 9 is an illustration showing separation of an image and character strings that is performed by the screen-capture translator.

FIG. 9 shows another example in which the screen-capture translator extracts character strings. In this example, when an initial screen 91 (in this example, a dialog) at the time of a problem exists, parts of character strings are cut out using the following data:

a) Data on a predetermined color of the dialog.
b) Data on a predetermined font of the dialog.

However, since the data on color and font of the dialog may differ from default values, the following methods are also utilized:

c) Select appropriate characters from fonts retained in an OS and compare the patterns.

When an image is Japanese, characters that are frequently used, such as Japanese hiragana characters and punctuations, are efficient. In this case, optimized characters are selected for individual languages.

d) Estimate colors of background and characters of a dialog on the basis of combinations of colors that have different levels of luminance and chroma using data on color tones such as luminance and chroma.

The process of extracting character strings is shown in a part indicated by reference numeral 92 in the drawing, and six sets of characters can be extracted. Data 93 that includes only an image is also retained.

Figure 10:
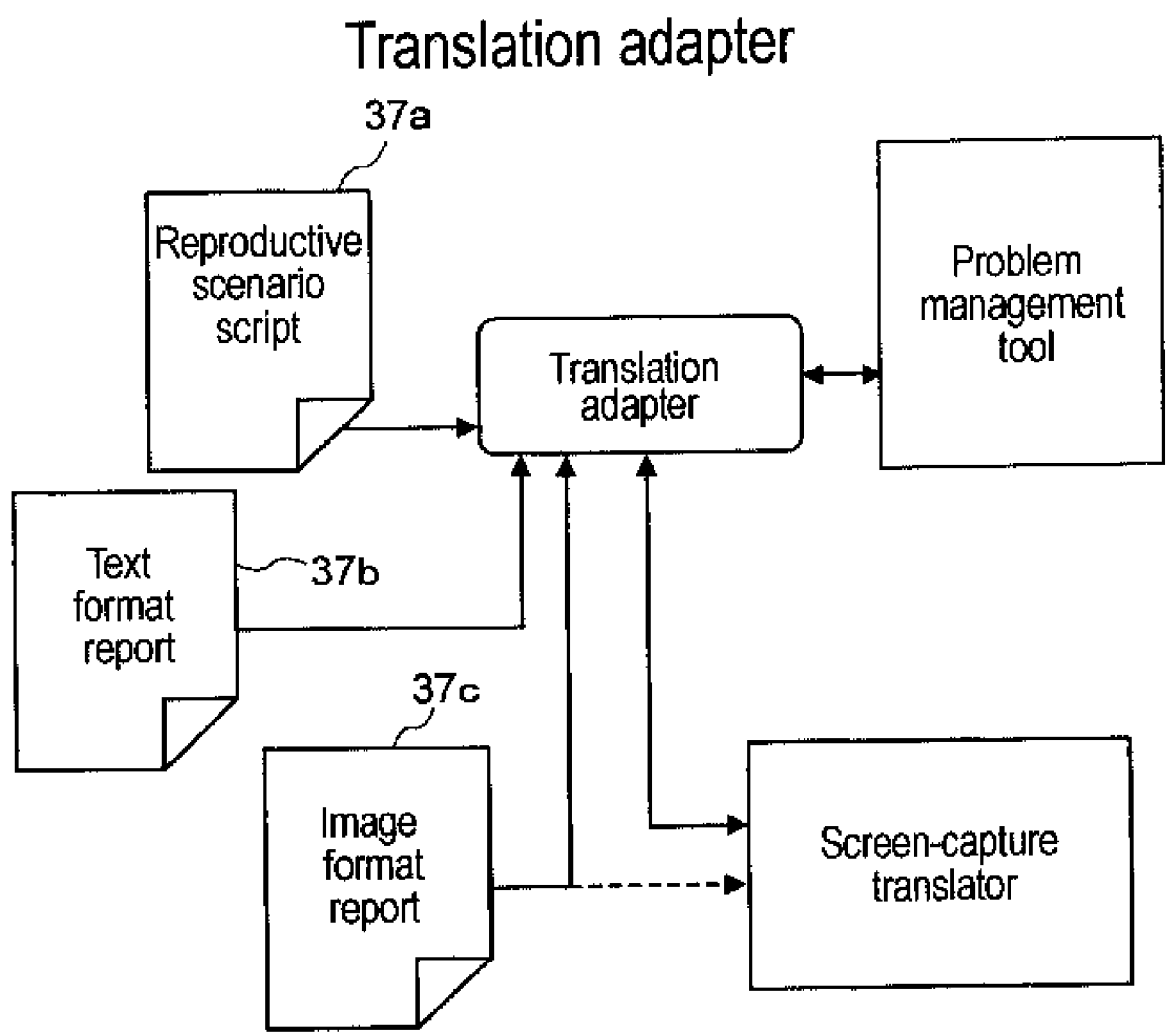
FIG. 10 is a schematic diagram of a translation adapter.

FIG. 10 shows the relationships between the translation adapter and other components. The translation adapter accepts a reproductive scenario script 37a, a text format report 37b, and an image format report 37c that need to be translated as input data, as described. The image format report 37c may be transferred directly to the screen-capture translator, or the translation adapter may invoke the screen-capture translator.

Figure 11:
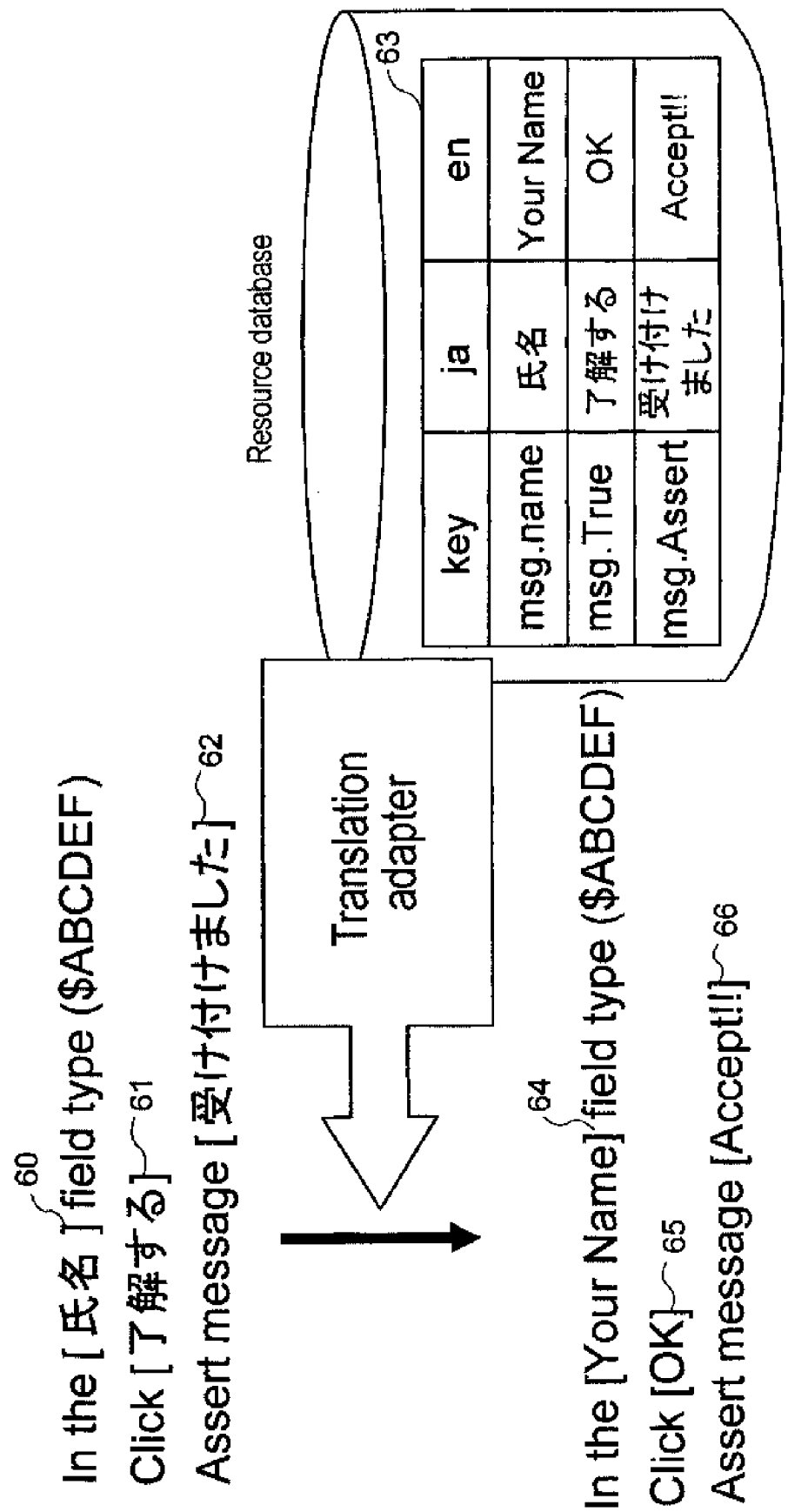
FIG. 11 is an illustration showing a simple exemplary reproductive scenario script.

FIG. 11 is an illustration showing a simple exemplary reproductive scenario script for the translation adapter. Fields 60 to 62 that are included in an original reproductive scenario script and retain character strings that need to be translated are recognized according to the script syntax, and character strings to be translated and character strings translated into a specified language are extracted with reference to a correspondence table 63 of individual languages in the resource database. The character strings, which have been extracted and translated, are embedded in the reproductive scenario script, as shown by reference numerals 64 to 66.

FIGS. 12 to 17 summarize the operation of a user support section at the time of occurrence of a problem and a series of operations of the resource crawler, the resource database, and the screen-capture translator, which were described above. These processes will now be described briefly though the description partially overlaps the above description.

Figure 12:
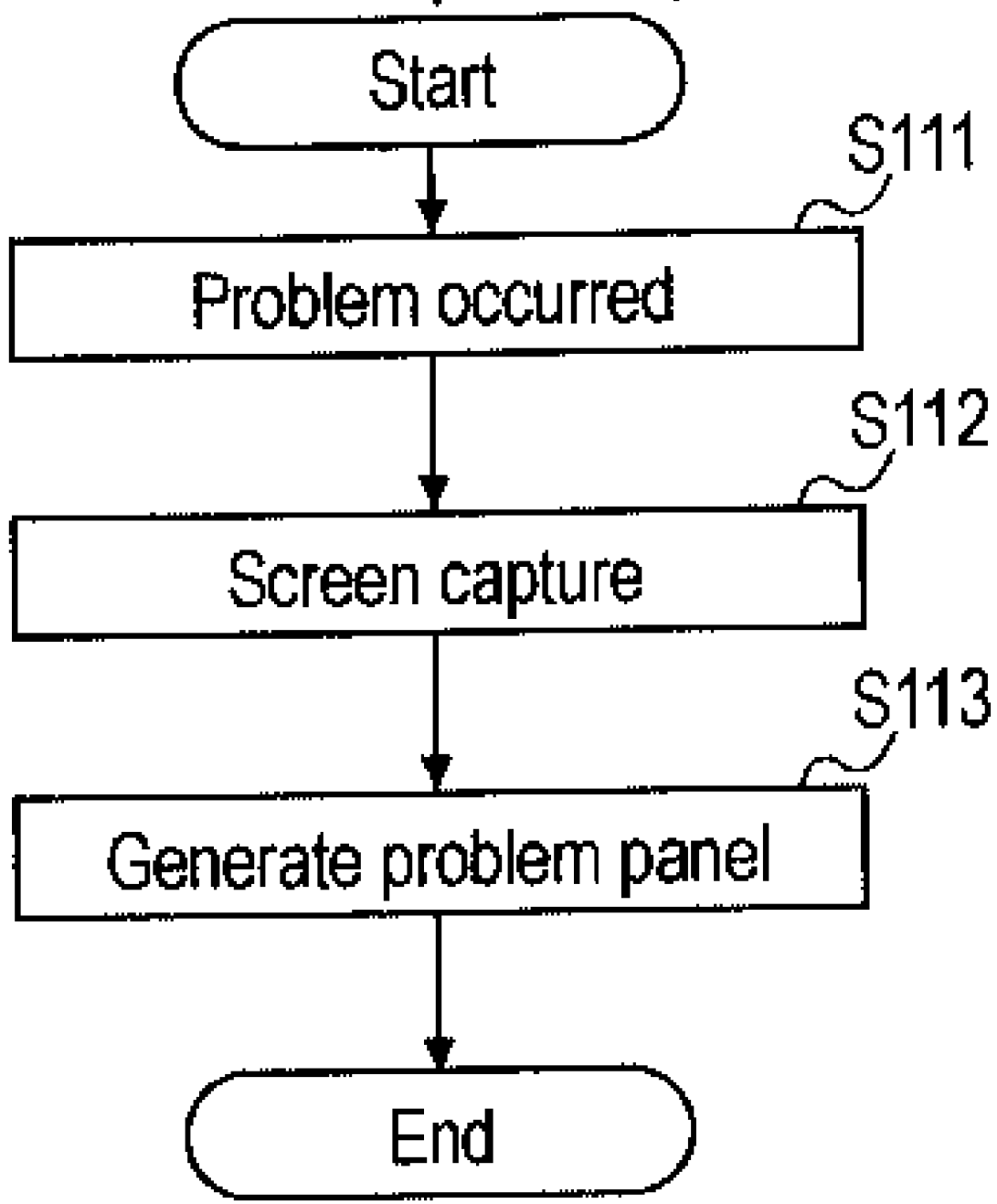
FIG. 12 is an illustration showing the process flow of generation of a problem panel.

FIG. 12 is an illustration showing the process flow of generation of a problem panel (corresponding to cut-out information showing a problem at the time of occurrence of a problem, in many cases, corresponding to a problem window or a problem dialog box), which is typically performed by a reporter in a support section, at the time of occurrence of a problem. In many cases, when a problem has occurred (step S111), a screen needs to be captured (shot) (step S112) to generate a problem panel (step S113).

Figure 13:
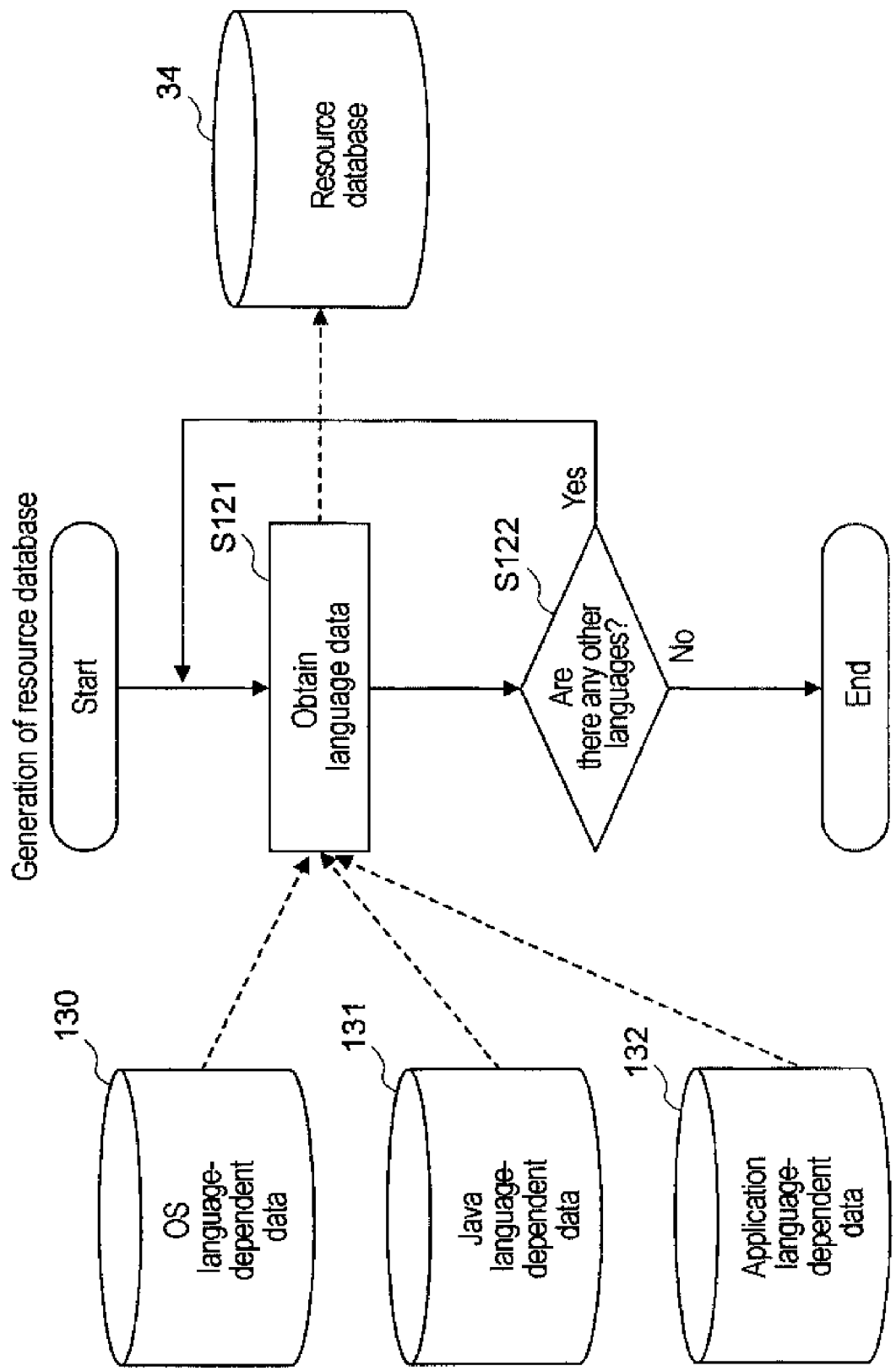
FIG. 13 is an illustration showing the process flow of generation of a resource database.

FIG. 13 is an illustration showing the process flow of generation of the resource database 34, which is performed by the resource crawler. Examples of the resource files include OS language-dependent data 130, Java (registered trademark) language-dependent data 131, and application language-dependent data 132. The resource crawler searches resource files regarding all languages that are supported by the corresponding software and stores in the resource database 34 data that is useful for translation, as shown in the drawing. See FIG. 6 for the details.

Figure 14:
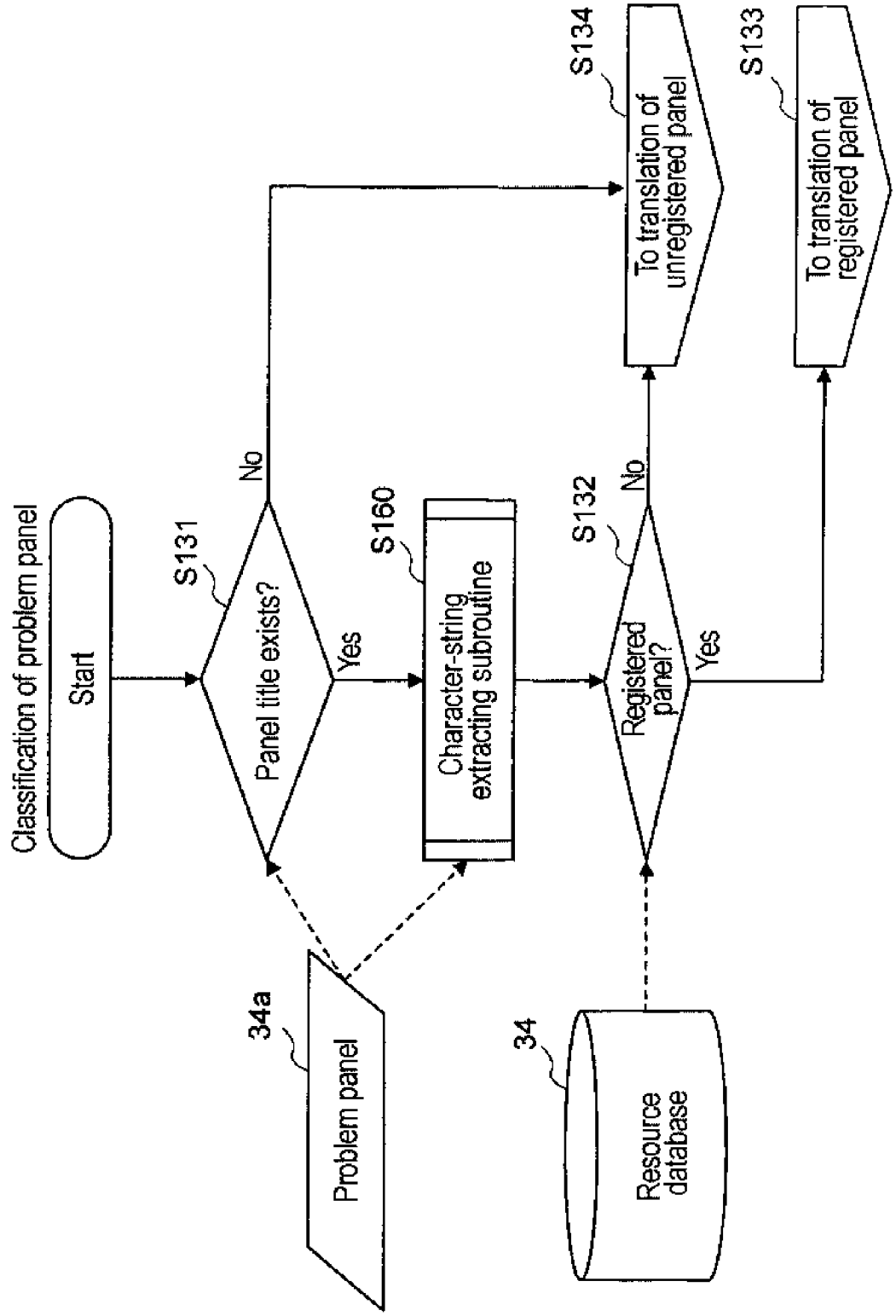
FIG. 14 is an illustration showing the process flow of classification of a problem panel.

FIG. 14 is an illustration showing the process flow of classification of a problem panel. In this case, it is assumed that a problem report is image data. The title (a panel title) of a corresponding screen is first checked (step S131). When it is determined that no panel title exists, it is determined that the screen is an unregistered panel, and the process proceeds to steps of translating an unregistered panel (step S134). When it is determined that a panel title exists, a character-string extracting subroutine is invoked from the image (step S160) to actually extract character strings. It is determined with reference to the resource database 34 on the basis of the panel title and the extracted character strings whether the problem panel has been already registered (step S132). When it is determined that the problem panel has been registered, the process proceeds to steps of translating a registered panel (step S133).

Figure 15:
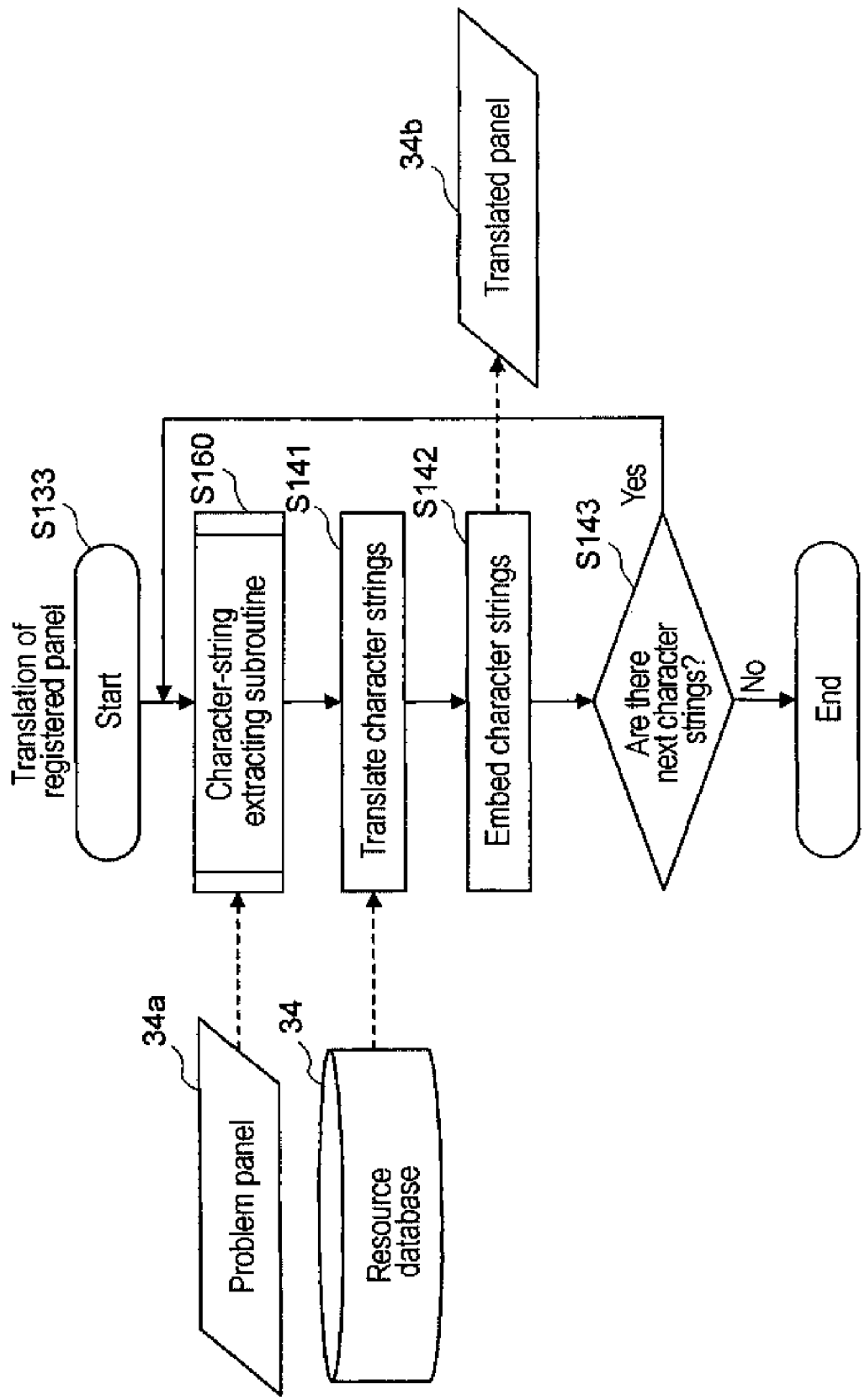
FIG. 15 is an illustration showing the process flow of translation of a registered panel.
Figure 16:
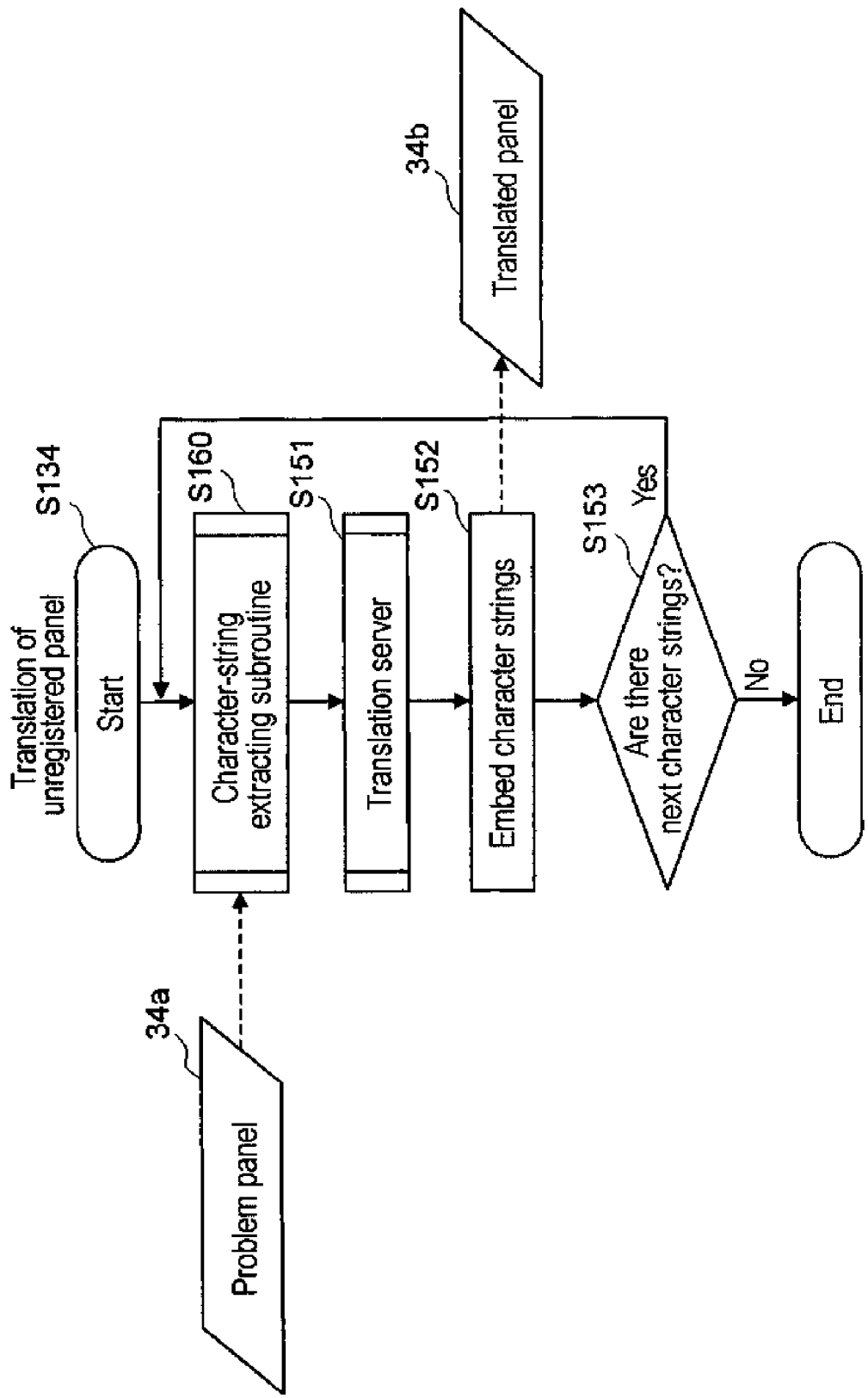
FIG. 16 is an illustration showing the process flow of translation of an unregistered panel.

FIG. 15 is an illustration showing the process flow of translation of a registered panel. FIG. 16 is an illustration showing the process flow of translation of an unregistered panel. The process up to step S160 where character strings that need to be translated are extracted from the problem panel 34*a* subjected to the process is common to registered-panel processing and unregistered-panel processing. In the case of a registered panel, character strings can be efficiently translated with reference to the resource database 34. In contrast, in the case of an unregistered panel, since necessary data does not exist in the resource database 34, a translation server that includes a known translation dictionary is invoked to perform necessary translation (step S151). The subsequent step where the translated character strings are embedded in an image is common.

Figure 17:
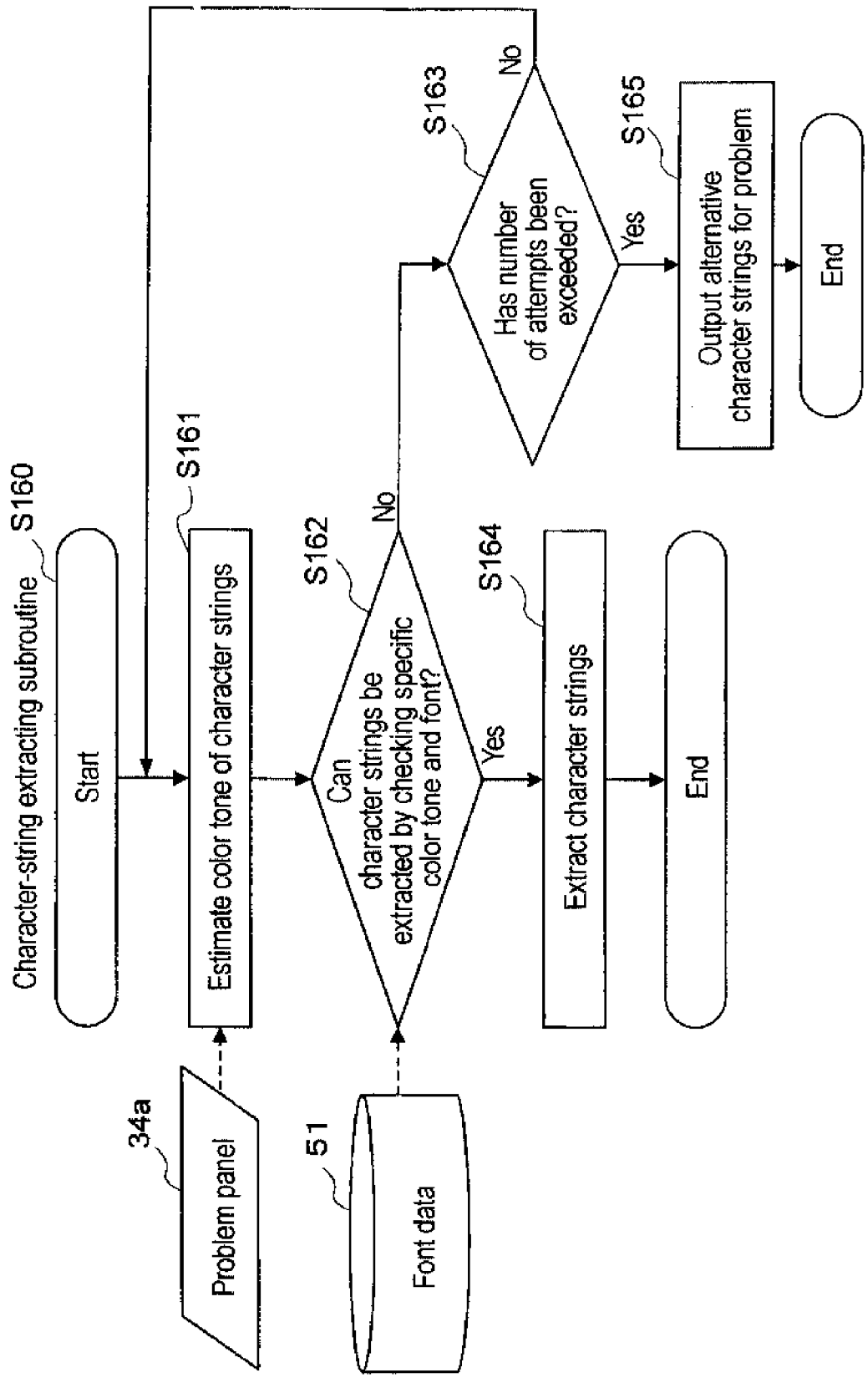
FIG. 17 is an illustration showing the process flow of a character-string extracting subroutine.

FIG. 17 is an illustration showing the process flow of the character-string extracting subroutine (step S160). The character-string extracting subroutine constitutes a core part of the screen-capture translator. Although the outline of this process has been already described, the details will now be described. The color tone of character strings is estimated in step S161, and it is determined in step S162 whether character strings can be extracted by checking specific color tone and font (pattern) with reference to the font data 51. When it is determined that character strings can be extracted, character strings are extracted (step S164). When it is determined that character strings cannot be extracted, steps S161 and S162 are repeated until a predetermined number of attempts has been reached while changing, for example, conditions for estimating color tone data. When the number of attempts has been exceeded, it is determined that character strings cannot be extracted, and alterative character strings for a problem are output (step S165).

1. The Outline of a Method

Figure 18:
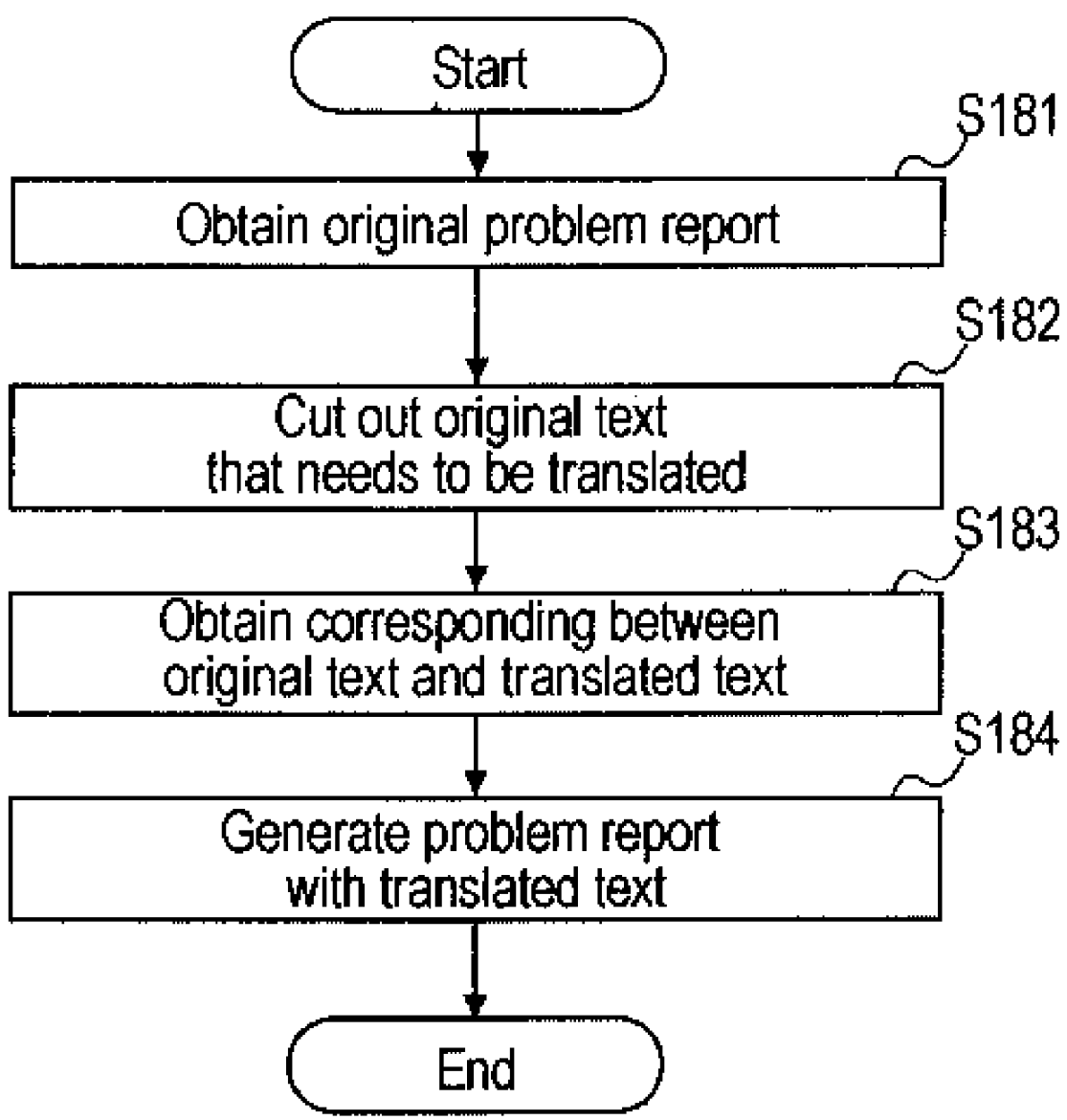
FIG. 18 is an illustration showing a simplified process flow of a method for reporting a software problem.

FIG. 18 summarizes the outline of a method for reporting software problems as another embodiment of the present invention. That is to say, in the present embodiments, the following four steps are performed:

(1) Obtain an original problem report (step S181).

Obtain a registered problem report.

(2) Extract parts that need to be translated from the text data.

Furthermore, recognize character parts in the image data, extract character strings, and extract image parts other than the character strings (step S182).

(3) Obtain the correspondence between an original text and a translated text (step S183).

That is to say, obtain a text translated into a user-desired language.

(4) Generate a problem report with the translated text (step S184).

That is to say, put an appropriate translated text in the parts, which were cut out in step (2). Embed the translated text in the image, which was generated in step (2), to reconstruct the image.

The foregoing steps (1) to (4) will now be further described.

(1) The flow until a translated text is obtained.

The following main three flows exist:

1) No matching candidate exists.

2) Only one matching candidate exists (translation can be uniquely determined).

3) More than one matching candidate exists.

A candidate means a character string in the same language as an original text, which is stored in the resource database. The character string is found at the time of search.

Figure 19:
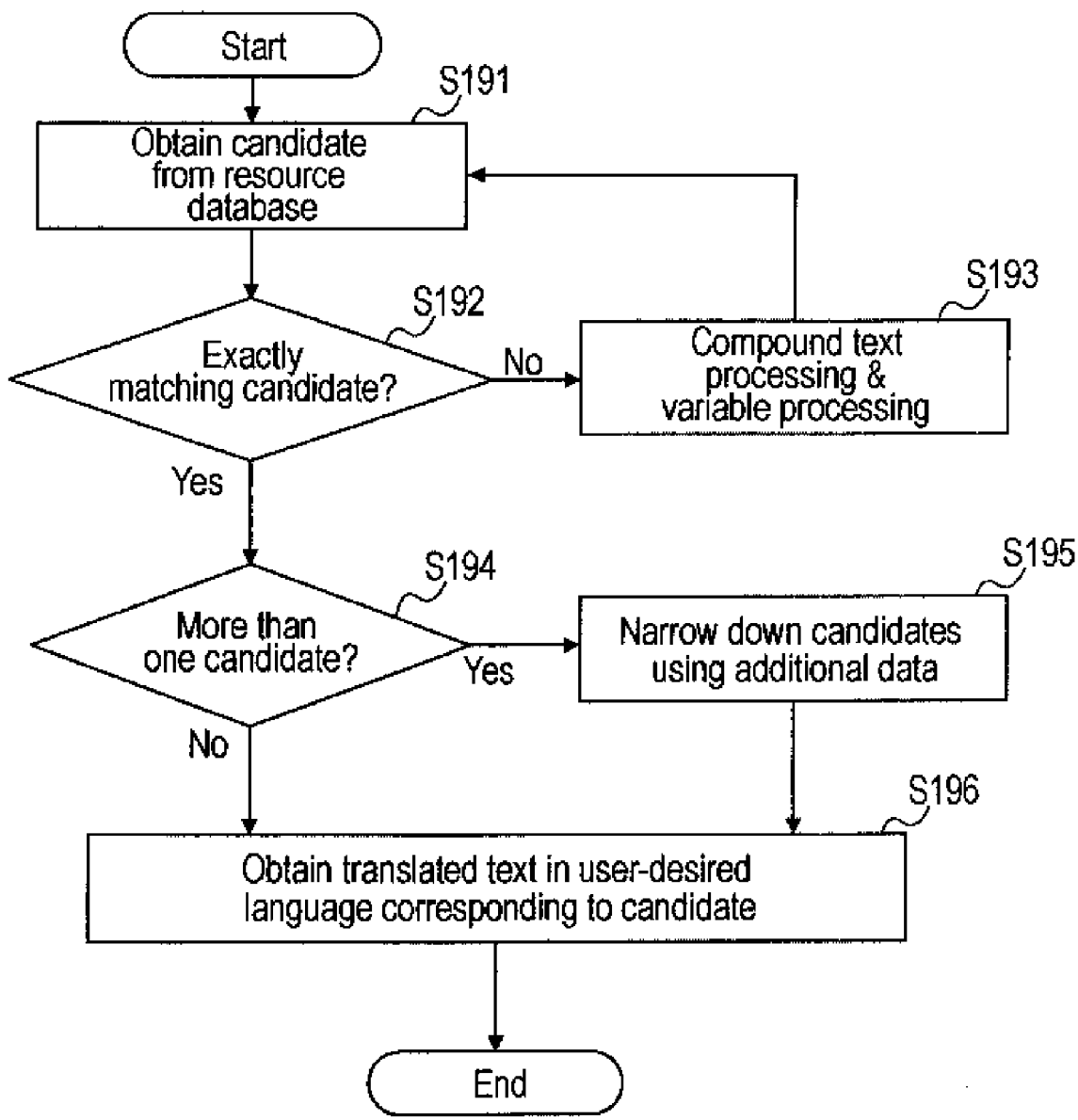
FIG. 19 shows the flow until a translated text is obtained.

This process flow is shown in FIG. 19. In step S191, a candidate is obtained from the resource database. Then, in step S192, it is determined whether an exactly matching candidate exists. When it is determined that no exactly matching candidate exists, compound text processing and variable processing are performed in step S193, and then the process goes back to step S191. When it is determined in step S192 that an exactly matching candidate exists, it is determined whether more than one exactly matching candidate exists (step S194). When it is determined that more than one exactly matching candidate exists, candidates are narrowed down using additional data in step S195, and the process proceeds to step S196. Even when it is determined in step S194 that more than one exactly matching candidate does not exist, the process proceeds to step S196, and a translated text, in a user-desired language, corresponding to the candidate is obtained.

(2) Cut out an original text required to be translated.

Figure 20:
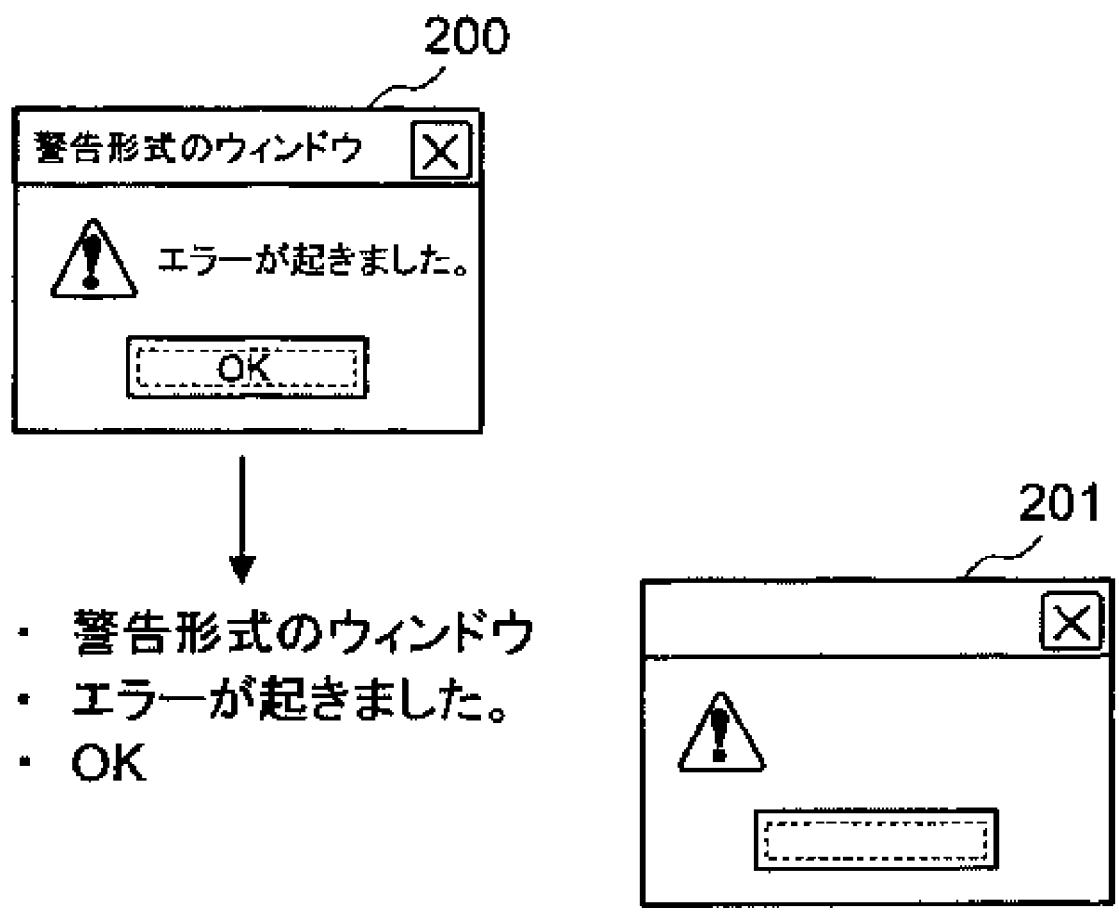
FIG. 20 shows the process of cutting out an original text that requires a translated text in the case of a screen format.

In the case of a screen, character strings are separated from the screen using a method, for example, the screen-capture translator. The separated character strings are an original text (see FIG. 20). In the case of a text format, character strings that need to be translated and other parts are separated using a method, for example, the translation adapter (see FIG. 21).

(3) Obtain the correspondence between an original text and a translated text.

1) The resource database is searched for a character string that exactly matches a given original text.

2) When a matching character string is found, a translated text, corresponding to the character string, in a desired language is obtained.

3) When more than one matching character string exists and when translated texts corresponding to the character strings are different from each other, processing for removing ambiguity is performed.

[A Case Where One Matching Character String Exists]

Data in a resource database shown in FIG. 22(*a*) is searched for a Japanese message "Keikoku Keishiki No Window" (a Japanese letter string meaning "Warning Window").

Since a matching character string is found, a corresponding translated text is obtained. For example, in the case of English, a Japanese message "Keikoku Keishiki No Window" (a Japanese letter string meaning "Warning Window") is translated into "Warning Window".

[A Case where more than One Matching Character String Exists]

Data in a resource database shown in FIG. 22(*b*) is searched for a Japanese message "Erah Ga Okimashita." (a Japanese letter string meaning "Error happened.").

Since matching character strings are found, corresponding translated texts are obtained. For example, in the case of English, a Japanese message "Erah Ga Okimashita." (a Japanese letter string meaning "Error happened.") corresponds to two messages "Error happened." and "Error occurred."

Furthermore, since more than one matching character string exists and corresponding translated texts are different from each other, processing for removing ambiguity is performed. See (2-3) A case where more than one candidate for a translated text exists, which is described below, for details.

When no matching character string is found, it is highly probable that an original text is composed of more than one character string or that a character string that is dynamically given is embedded. A translated text is obtained by searching for a character string after dividing an original text and removing variables. See (2-2) A case where no candidate for a translated text exists, which is described below, for details.

(4) Generate a problem report with a translated text.

Figure 23:
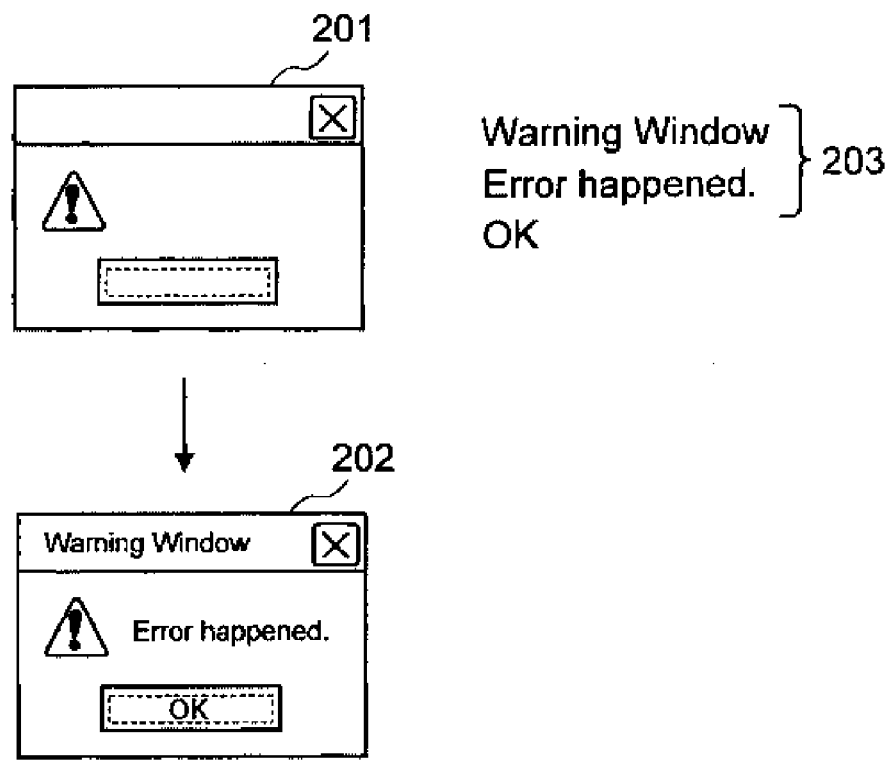
FIG. 23 is an illustration showing the process of generating a problem report with a translated text in the case of a screen format.

In the case of a screen, the screen is reconstructed with an obtained translated text (see FIG. 23).

Figure 24:
FIG. 24 is an illustration showing the process of generating a problem report with a translated text in the case of a text format.

In the case of a text format, an obtained translated text is put in a place that needs to be translated (see FIG. 24).

2. The Details of the Flow of Obtaining a Translated Text

The flow of obtaining a translated text will now be described in detail.

(2-1) A case where only one candidate for a translated text exists.

Figure 25:
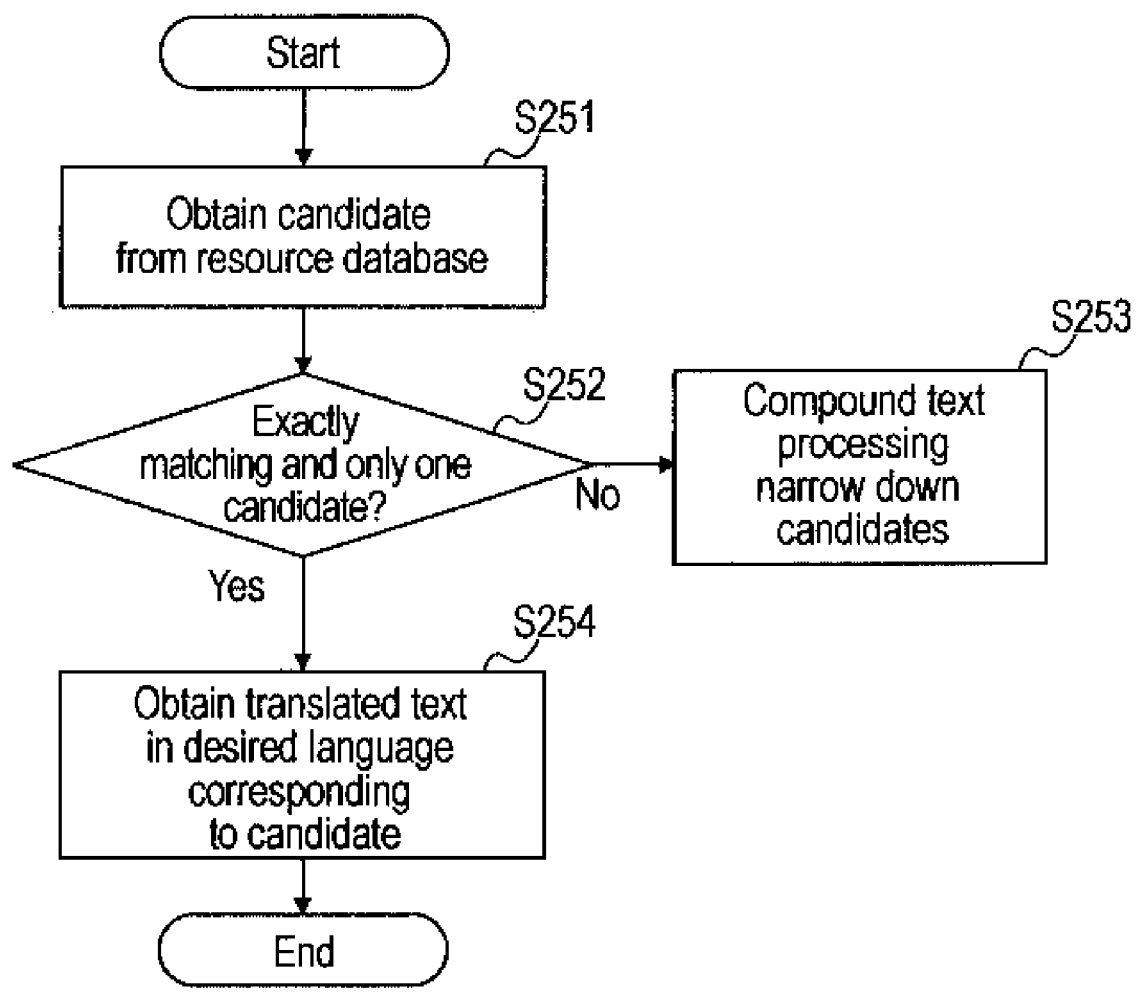
FIG. 25 is an illustration showing the process flow of obtaining a translated text in a case where only one candidate for a translated text exists.

When only one candidate that matches an original text exists in the resource database, a corresponding translated text can be uniquely determined. This process flow is shown in FIG. 25. In step S251, a candidate for a translated text is obtained from the resource database. Then, when it is determined in step S252 that the obtained candidate exactly matches the original text and is only one candidate, a translated text, corresponding to the candidate, in a user-desired language is obtained (step S254). When it is determined in step S252 that the obtained candidate does not exactly match the original text or is not only one candidate, compound text processing, variable processing, narrowing down the candidates, or the like is performed (step S253).

(2-2) A case where no candidate for a translated text exists.

The resource database retains all data of, for example, messages that appear in applications. When a character string that matches an original text does not exist in the resource database, the original text may be composed of more than one character string. That is to say, the following two cases can be supposed:

1) A case where the original text is composed of a combination of more than one character string, not one sentence.

2) A case where a character string that is dynamically given is embedded in the original text.

In these cases, a matching translated text can be searched for by dividing the original text at a boundary in the text or cutting out variables separately.

Figure 26:
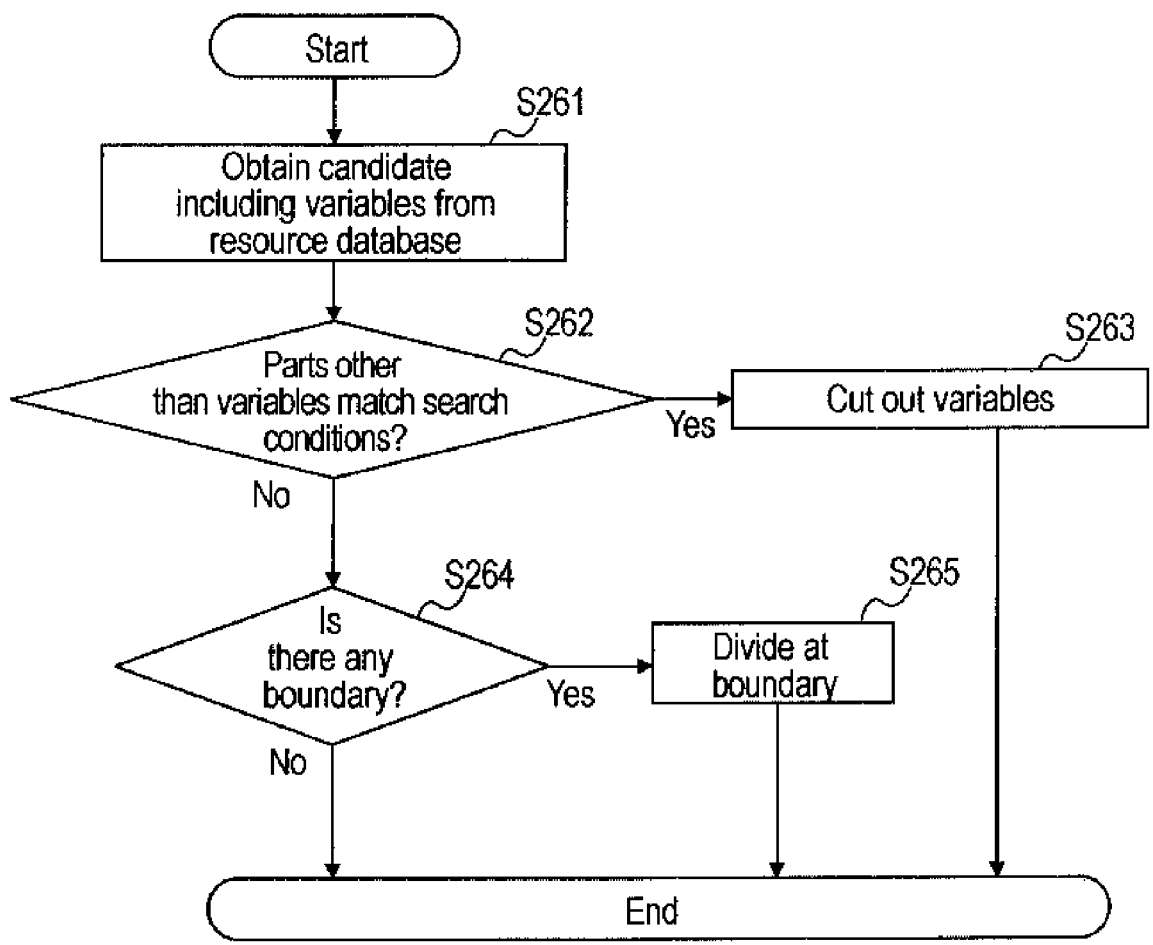
FIG. 26 is an illustration showing the process flow of obtaining a translated text in a case where no candidate for a translated text exists.

This process flow is shown in FIG. 26. In step S261, a candidate that includes variables is obtained from the resource database. When it is determined in step S262 that parts other than the variables match the search conditions, the variables are cut out (step S263), and the process is completed. When it is determined in step S262 that parts other than the variables do not match the search conditions, it is determined whether a boundary exists in the original text. When it is determined in step S264 that a boundary exists, the original text is divided at the boundary in step S265, and the process is completed. When it is determine in step S264 that no boundary exists, the process is completed.

In the case of 1):

The boundary between character strings is recognized and the character strings are separated. The boundary between character strings can be recognized using data of line breaks, spaces, punctuations, and the like. Furthermore, when morphological analysis is adopted, character strings can be separated into units each having meaning.

In the case of 2):

When a character string that includes variables exists in the resource database, a sentence that matches the search conditions in its parts other than the variables is obtained. When a translated text corresponding to the variables can be obtained from the resource database, the translated text is inserted into the obtained sentence.

(2-3) A case where more than one candidate for a translated text exists.

In some cases, more than one candidate for a translated text exists for a text to be translated in the resource database. For example, in the case of a comparatively simple sentence, such as a Japanese sentence "Erah Ga Okimashita." (a Japanese letter string meaning "Error happened."), more than one candidate for a translated text may exist, for example, "Error occurred." and "Error happened.". Thus, it needs to be determined which translated text is adopted. An important basis for this determination is a context in which a corresponding sentence is displayed. Here, attributes that provide a basis for correctly selecting a translated text are called additional attributes. The accuracy of translation can be improved using additional attributes.

In software programs, many additional attributes of character strings can be supposed. The following additional attributes are supposed to provide accurate information for selecting an appropriate translated text. The individual additional attributes provide the following pieces of information:

1) Window type
   a) The purpose of a message, for example, warning, error, or information.
   b) The type of response that is required, for example, YES or NO, or OK.
   c) The window ID.
   d) The process sequence in which a message is displayed.
   e) Which window the corresponding character string belongs to.
   f) The parent-child relationship of a window to which the corresponding character string belongs.
2) Naming conventions
   g) The purpose of a message.
   h) The category of an occurrence place.
   i) The name of a class in which a message exists.
3) Screen information
   j) The purpose of a message.
   k) What type of response is required.
   l) The category of a place where a message occurs, for example, a button, a menu, or a message text.

These additional attributes can be used separately or in combination. These additional attributes will now be described as first to third embodiments.

FIRST EMBODIMENT

[A Method in which a Window Type is an Additional Attribute]

In general, in software programs, software programmers do not program message windows from the start, but existing custom windows are used. An OS retains custom windows from the initial state. When a custom window needs to be used, a programmer merely needs to specify the title of the window, a message text, and the type of the window. This applies to programming languages for creating programs in which a GUI is provided, for example, C/C++, Java (registered trademark), and Visual Basic (registered trademark).

<Data Scanned by the Resource Crawler>

The resource crawler scans source code of a program to obtain a window type. A sample program in which Visual Basic (registered trademark) is used is shown in FIG. 27 for the sake of simplification. A function MsgBox displays a message window, and arguments 1 to 3 represent a message text, the type of the message window, and the title of the message window, respectively. This program can be run by typing "cscript messages.vbs" at a command prompt.

When the foregoing program is executed, message windows shown in FIG. 28 are displayed. A message window type represents, for example, a message window (281) in which a message is issued as "Fatal error" and only an OK button can be pressed in response to the message, a message window (282) in which a message is issued as "Warning" and only an OK button can be pressed in response to the message, a message window (283) in which a YES or NO response can be returned in response to a message, or a message window (284) in which more than one action can be selected. A message window type retains much information in such a manner. A dozen or so message window types exist, and dozens of combinations of message window types and response buttons exist. Thus, a message window type can be an important additional attribute for uniquely determining a translated text.

<A Method for Implementing the Resource Crawler>

Since APIs for displaying message screens are limited, the resource crawler can be implemented via a program that performs simple text processing. Specifically, the resource crawler can be implemented via, for example, shell scripts using regular expression functions. Regular expression functions mean a group of pattern processing functions that can be used for extracting only necessary character strings from a text file. In the foregoing program sample of Visual Basic (registered trademark), the resource crawler can be implemented via a process of extracting character strings enclosed in double quotation marks (") and character strings that represent window types and start with vbXXX (the format of a window type) from a line in which "MsgBox" appears.

<The Resource Database>

Figures 29, 30:
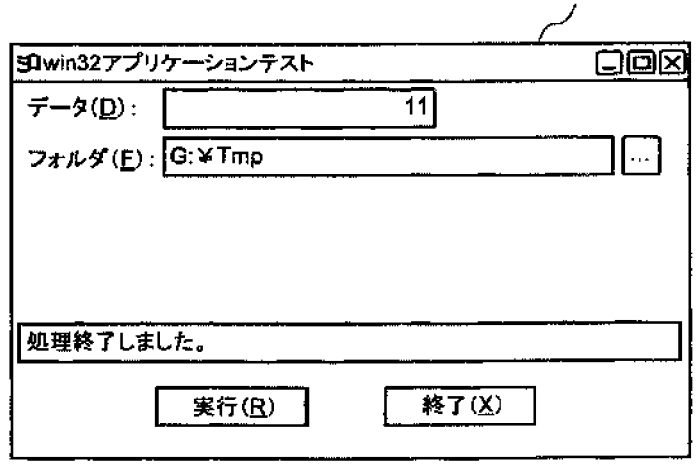
FIG. 29 is an illustration showing a resource database that retains message types.
FIG. 30 is an illustration showing an exemplary dialog window.

The resource database retains the types and titles of message windows. FIG. 29 shows an exemplary resource database that retains message types.

<Translation Determination Algorithm>

It is assumed that a Japanese message "Erah Ga Okimashita." (a Japanese letter string meaning "Error happened.") exists in a problem report. When the type of a message window that displays the message and the dialog title are respectively vbExclamation and a Japanese message "Keikoku Keishiki No Window", it can be determined that a translated text is "Error happened".

A message window type and a dialog title are determined in a problem report in the following ways. The following two patterns can be supposed:

In a case where a problem report is described in text: Since the title of a dialog is described, translation is determined on the basis of the title. Furthermore, a message window type can be determined on the basis of a keyword such as "Warning" or "Information" in a report.

In a case where a problem is reported via screen capture: Other than messages that appear on a screen, additional attributes are taken from parts other that characters retained in the image and used. See [Supplement: Extracting icons from screen capture] shown in a third embodiment described below for the details.

SECOND EMBODIMENT

[A Method in which a Window ID is an Additional Attribute]

It will be shown that a translated text can be correctly selected by linking translation character strings to a window ID. A dialog window in FIG. 30 is shown as an example.

This dialog window includes text labels, input fields, buttons, and the like. Unique IDs are assigned to all of these components within a program, and the program identifies the components on the basis of these IDs. For example, an action taken by a user on the dialog window is presented to the program as an event. A case where the EXECUTE button is clicked will be shown as an example. Assuming that an ID number 100 is assigned to the EXECUTE button, a message "The click button is pressed on the component 100." is issued from an operating system. The process in this case is defined in program code (with, for example, a case statement). That is to say, the ID number can be said to be means for determining a component with complete accuracy.

<Data Scanned by the Resource Crawler>

FIG. 31 shows a part of source code (sample.rc) called a resource file for defining the shape of a dialog window and the IDs of components that constitute the dialog window in a program in the Windows (registered trademark) operating system.

A LANGUAGE declaration 311 in the first line shows a language for which the following definitions are made. Then, following #define declarations 312 define the IDs of components. Then, data for linking character strings of the components to the IDs and the like follow:

IDD_TEST DIALOGEX 22, 17, 257, 130 . . . 313

CAPTION "win32 apurikehshon tesuto" (a Japanese letter string meaning "win32 application test") . . . 314 representing the ID of this dialog window and the dialog title ("win32 apurikehshon tesuto" (a Japanese letter string meaning "win32 application test")), respectively. The ID is found to be 100 (because IDD_TEST is defined as 100 in # define declaration). The following figures represent the location of the window. The coordinates (22, 17) are the staring point, the width is 257, and the height is 130. Then, a BEGIN statement 315 and the following statements represent, for example, links between the character strings on the components on the dialog window and the IDs.

For example, LTEXT "dehta(&D):",IDC_STATIC_1,6,9, 50,8 ("dehta" is a Japanese letter string meaning "data") means that the ID number of a character string "dehta(&D):" is 102.

<A Method for Implementing the Resource Crawler>

In a case where a program source can be accessed:

The resource crawler scans the foregoing file to generate the resource database. The flow is as follows:

1) A language declaration is found, and the language is stored in the resource database.

2) The ID of a dialog window and a title character string are stored.

3) The IDs of individual components and character strings linked to the IDs are stored.

This flow can be implemented via a program that performs simple text processing. Specifically, this flow can be implemented via, for example, shell scripts in which regular expression functions are used. Regular expression functions are a group of pattern processing functions that can be used for extracting only necessary character strings from a text file.

In a case where a program source cannot be accessed:

The resource database can be readily generated when source code is directly accessed. Thus, it is assumed that a developer of a software program for which a problem is reported provides the source code. However, even in a case where source code cannot be accessed, that is to say, even in a program provided only in an executable format (a binary format), a window ID and character strings can be obtained.

<The Resource Database>

The data is stored in order in a resource database shown in FIG. 32. The resource database retains window IDs. In addition to pairs of original and translated texts of individual character strings, (window) IDs 330 and parent (window) IDs 331 are retained. For example, it can be found that "dehta" and "foruda" (respectively meaning "data" and "folder") belong to a window having a window ID of 100 and a window title "win32 apurikehshon tesuto" (a Japanese letter string meaning "win32 application test"). Since the data is stored in this way, the links between components that are hierarchically structured can be determined on the basis of the chain format.

<Translation Determination Algorithm>

In general, a series of operations of, for example, selecting a menu, displaying a screen, and processing on the screen is described in a problem report. For example, the SELECT button is pressed on a file selection screen. Thus, translation character strings belonging to the same window usually appear in the neighborhood. Accordingly, when a plurality of candidates for a translated text exist, the accuracy of translation can be improved by buffering, for example, several translation character strings in the neighborhood and selecting translation character strings belonging to a common parent ID by priority.

[A Method in which a File Structure and a Message Key are Additional Attributes]

The resource files retain combinations of messages that are inserted at the time of executing a program and message keys that uniquely represent the messages. The resource files are packed in a file according to predetermined rules. The structure of the file, in which the resource files are located, is also based on rules. Furthermore, regularity can be readily found in the naming conventions of message keys. These implicit and explicit rules regarding the resource files are used as additional attributes.

<Data Scanned by the Resource Crawler>

The resource crawler searches resource files that can be obtained from an application and the execution environment, extracts individual country language messages from the resource files, and stores the messages in the database. At the same time, in addition to the relevant texts, message keys, the names of files from which the texts are obtained, data that can be obtained from the file structure and the like are stored in the database.

Exemplary property resource files that are retained in Java (registered trademark) are shown in FIG. 33. Property resource files are packed in a jar file (compressed executable files that constitute a program) or stored in folders. When property resource files are packed in, for example, a jar file, the property resource files are unpacked. At the same time, a directory structure in which the property files exist, the directory names, and the structure of the jar file are obtained.

These pieces of data include the names of applications that output the messages, relevant class names, version numbers and the like, and are used as additional attributes. Furthermore, message keys corresponding to the messages are obtained, and messages that have the same message keys and similar additional attributes are paired.

<A Method for Implementing the Resource Crawler>

The resource crawler searches resource files that can be obtained from an application and the execution environment.

In this process, when the resource files are in a packed format such as a jar file, the resource files are unpacked, and the content is scanned. When the resource files are in a binary format, the resource files are transformed into a readable format. This mechanism can be implemented via the equivalent of, for example, a virus scanner or a file search function provided in an OS. Since resource files are described according to a predetermined format, messages, keys, and additional attributes can be extracted using simple regular expression processing and stored in the database.

<The Resource Database>

Message keys 350 (messagekey) and additional attributes 351 to 353 (class name, Version, and folder) are stored in order in the resource database, as shown in FIG. 34. Individual country language messages are retained in the same lines.

<Translation Determination Algorithm>

It is assumed that a button called "Chuusi" (a Japanese letter string meaning "Abort") appears. Texts "Abort" and "Break" are obtained from the resource database as candidates for a corresponding translated English text. In this case, it is determined which text is appropriate for the translated text using additional attributes.

In a case where the naming conventions of message keys are used:

In general, implicit and explicit naming conventions apply to message keys. Data about, for example, places where messages are used or the status of messages is obtained from corresponding message keys using these conventions. In the case of "Chuusi" (a Japanese letter string meaning "Abort"), it is determined according to the naming conventions that one corresponding message is the name of a button and the other corresponding message is an item on a window menu, and the text "Abort" is determined as the candidate for the translated English text. Since naming conventions are defined corresponding to a product or a project, message keys according to general naming conventions can be readily handled. The accuracy can be improved by defining predetermined rules for individual products.

In a case where a class name or a folder name is used:

The process ID of an application, the name of a file that is being used by a process, and the like can be obtained using known tools. The most reliable candidate can be selected by checking these pieces of data and a class name and a folder name retained in the resource database.

In a case where acceptable character strings are selected:

When a probable candidate cannot be determined, it is determined whether both messages are allowed to be described in parallel. When it is determined that no failure occurs when automatic execution is performed in a reproductive scenario script, both messages are described in parallel, and automatic determination is performed at the time of executing the script. For example, when it is determined (as the result of translation of other messages, buttons, and the like) that both candidates "Break" and "Abort" do not appear on the same screen, execution of the script is enabled by describing both messages in parallel in the form of "button [Abort:Break]".

[Supplement: Extracting Icons from Screen Capture]

Figure 35:
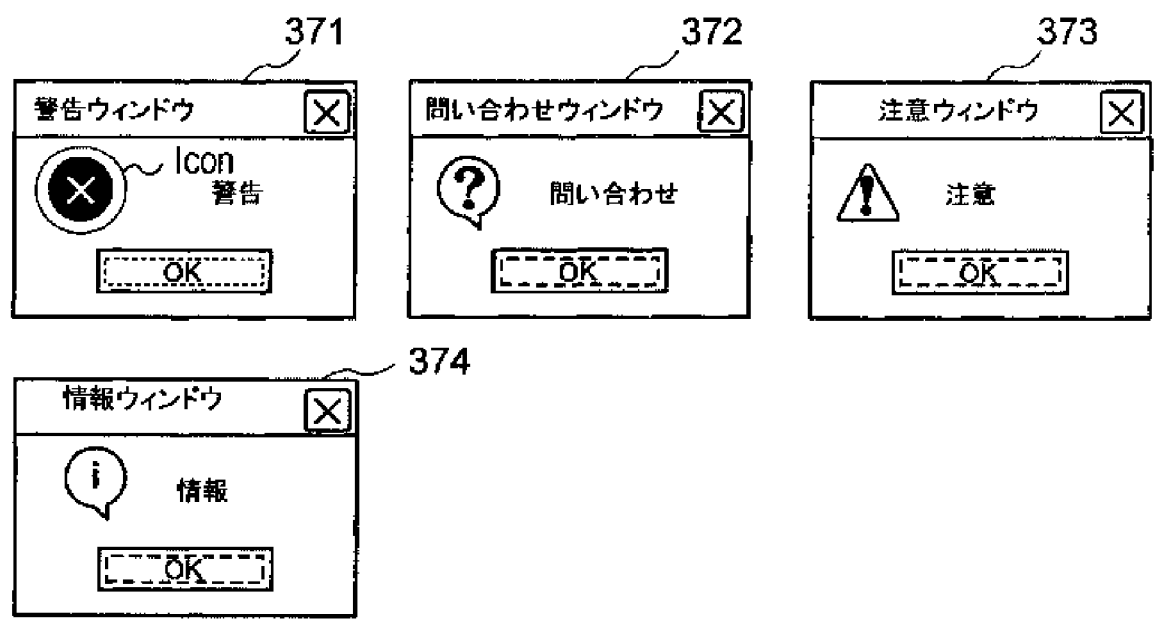
FIG. 35 is an illustration showing icons that indicate the system-unique status on message screens for attracting the user's attention.

An icon that indicates the system-unique status appears on a message screen that is displayed by software, especially, on a message screen for attracting the user's attention. Exemplary screens 371 to 374 on each of which such an icon appears are shown in FIG. 35. Each icon represents the nature of a message that is issued from the corresponding window and can be used as an additional attribute for uniquely determining a translated text. Furthermore, for example, data of the number of input fields and buttons that exist on a screen can be additional attributes by linking the data to other data. An icon may vary with countries. Thus, an icon may be changed to one that is suitable to the corresponding country at the time of determining a translated text.

<Implementation in the Screen-Capture Translator>

In many systems, displays of icons, buttons, and the like that appear on a screen are standardized. Thus, the nature of information that appears on a screen, the type of required action, and the like can be obtained with high accuracy by retaining system standard icons in the resource database in advance and performing simple pattern matching. Pattern matching means detecting in an input image an object that is the same as or close to a standard pattern that is prepared in advance. Furthermore, a standard pattern that is prepared in advance is called a template, and checking the correlation between an input image and a template on the pixel data level while moving the template overlapping the input image is called template matching.

While the present invention has been described using the embodiments, the technical scope of the present invention is not limited to the scope described in the foregoing embodiments. Various changes or improvements may be made in the foregoing embodiments. It is apparent from the description in the claims that the embodiments that are changed or improved may be included in the technical scope of the present invention.

The software-problem reporting device 20, which has been described as an embodiment in the present invention, and the functions may be realized by a system or a computer program that causes a computer to execute the functions on a computer. The computer program may be provided in the form of a computer-readable recording medium that stores the computer program. The medium may be an electronic, magnetic, optical, electromagnetic, or infrared medium, a semiconductor system (or device or unit), or a transmission medium. Exemplary computer-readable recording media include a semiconductor or solid-state storage unit and a magnetic tape. Exemplary detachable computer-readable media include a semiconductor or solid-state storage unit, a magnetic tape, a detachable computer diskette, a random access memory (RAM), a read only memory (ROM), a rigid magnetic disk, and an optical disk. Examples of the current optical disk include a compact disk-read only memory (CD-ROM), a compact disk-read/write (CD-R/W), and a DVD.

What is claimed is:

1. A method comprising:
   receiving at least one resource file including historical problem reports in a plurality of different human natural languages, the historical problem reports including information related to use of a software program;
   extracting message keys from the at least one resource file, wherein the message keys identify various types of error messages displayable with respect to use of the software program;
   extracting character strings from the at least one resource file, each character string corresponding to a particular message key of the message keys;
   storing the extracted character strings in a database;
   extracting a particular character string from a received problem report;
   determining that the received problem report includes an image having an embedded character string;
   separating the embedded character string from the image;
   retrieving a first translation of the particular character string from the database based at least partially on the message keys and based on at least one attribute of the particular character string;
   identifying a second translation of the embedded character string in the database;
   retrieving the second translation from the database;
   embedding the first translation of the particular character string into the received problem report; and
   embedding the second translation in a separated portion of the image.

2. The method of claim 1, wherein retrieving the first translation of the particular character string from the database comprises:
   determining that the particular character string has a plurality of translations; and
   identifying a first translation from the plurality of translations based partially on at least one attribute of the particular character string.

3. The method of claim 2, wherein the at least one attribute is one of a context of the particular character string, a purpose of the particular character string, a type of a response requested by the particular character string, a relationship of a first window in which the particular character string is displayed to a second window, and a location in which the particular character string is displayed.

4. The method of claim 1, further comprising receiving a script for reproducing a software problem.

5. A computer program product comprising a computer usable medium including a computer readable program, wherein the computer readable program when executed by a computer causes the computer to:
   extract character strings corresponding to message keys from resource files, wherein the message keys identify various types of error messages displayable with respect to use of a software program, wherein the resource files include historical problem reports in a plurality of different human natural languages, and wherein the historical problem reports include information related to use of the software program;
   store the extracted message keys and associated character strings in a database;
   extract a character string from a received problem report describing a software problem;
   determine that the received problem report includes an image having an embedded character string;
   separate the embedded character string from the image;
   retrieve a translation of the character string from the database;
   determine that the character strong has a plurality of translations;
   identify a translation among the plurality of translations using at least one attribute of the character string, wherein the at least one attribute is one of a context of the character string, a purpose of the message string, a type of a response requested by the character string, a relationship of a first window in which the character string is displayed to a second window, and a location in which the character string is displayed;
   translate the embedded character string;
   add the translation to the received problem report to create a revised problem report; and
   embed the translation of the embedded character string into the image.

* * * * *